United States Patent
Ikuta et al.

(10) Patent No.: US 11,912,333 B2
(45) Date of Patent: Feb. 27, 2024

(54) STEERING DEVICE

(71) Applicant: NSK LTD., Tokyo (JP)

(72) Inventors: Tomohiro Ikuta, Gunma (JP);
Yoshiyuki Sato, Gunma (JP); Suguru Sugishita, Gunma (JP); Hirotaka Shimizu, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/915,293

(22) PCT Filed: Mar. 25, 2021

(86) PCT No.: PCT/JP2021/012717
§ 371 (c)(1),
(2) Date: Sep. 28, 2022

(87) PCT Pub. No.: WO2021/200599
PCT Pub. Date: Oct. 7, 2021

(65) Prior Publication Data
US 2023/0132450 A1    May 4, 2023

(30) Foreign Application Priority Data
Mar. 30, 2020 (JP) .................. 2020-059478

(51) Int. Cl.
*B62D 1/184* (2006.01)
*B62D 1/185* (2006.01)

(52) U.S. Cl.
CPC ............ *B62D 1/184* (2013.01); *B62D 1/185* (2013.01)

(58) Field of Classification Search
CPC ............................. B62D 1/184; B62D 1/185
See application file for complete search history.

(56) References Cited

U.S. PATENT DOCUMENTS 9,834,245 B2 * 12/2017 Orihara .................... B62D 1/19
10,093,341 B2 * 10/2018 Johta ........................ B62D 1/19
(Continued)

FOREIGN PATENT DOCUMENTS

CN       204399264 U       6/2015
CN       105026243 A  *   11/2015   ............. B22D 17/00
(Continued)

OTHER PUBLICATIONS

International Search Report for PCT/JP2021/012717, dated Jun. 8, 2021.

*Primary Examiner* — Faye M Fleming
(74) *Attorney, Agent, or Firm* — Sughrue Mion, PLLC

(57) ABSTRACT

A steering device includes a steering shaft, a steering column, a bracket, and a fastening mechanism. An upper column includes a clamp, a cylindrical part, a pair of protrusions, and contact ribs. The clamp includes a continuous clamp and a spaced clamp. The protrusions include a continuous protrusion and a spaced protrusion. The contact ribs include first contact ribs disposed each of which is disposed on the outer peripheral surface of the clamp, second contact ribs each of which is disposed on a side surface of the protrusion and disposed opposite to the first contact rib with respect to a long groove, and at least one third contact rib disposed on a side surface of the spaced protrusion and between the first contact rib and the long groove. The third contact rib has a protrusion amount greater than those of the first contact rib and the second contact rib.

2 Claims, 17 Drawing Sheets

(56) References Cited

U.S. PATENT DOCUMENTS

| | | | |
|---|---|---|---|
| 11,148,703 B2* | 10/2021 | Sugishita | B60R 25/021 |
| 2010/0000366 A1 | 1/2010 | Nomura et al. | |
| 2013/0327177 A1 | 12/2013 | Tanaka | |
| 2018/0029627 A1 | 2/2018 | Sugishita et al. | |
| 2018/0029628 A1 | 2/2018 | Sugishita | |
| 2020/0189642 A1 | 6/2020 | Sugishita et al. | |
| 2023/0143956 A1* | 5/2023 | Ikuta | B62D 1/185 74/493 |
| 2023/0143959 A1* | 5/2023 | Ikuta | B62D 1/185 74/493 |

FOREIGN PATENT DOCUMENTS

| | | | |
|---|---|---|---|
| JP | 2005075183 A * | 3/2005 | B62D 1/184 |
| JP | 2006-168492 A | 6/2006 | |
| JP | 2008-114788 A | 5/2008 | |
| JP | 2008-254510 A | 10/2008 | |
| JP | 2009-149303 A | 7/2009 | |
| JP | 2013-023040 A | 2/2013 | |
| JP | 2013-256193 A | 12/2013 | |
| JP | 2017-197178 A | 11/2017 | |
| JP | 2018-008595 A | 1/2018 | |
| JP | 2018-079821 A | 5/2018 | |
| JP | 2018-083613 A | 5/2018 | |
| JP | 6958162 B2 * | 11/2021 | |
| WO | 2016/186149 A1 | 11/2016 | |
| WO | 2017/068804 A1 | 4/2017 | |
| WO | WO-2017068804 A1 * | 4/2017 | B62D 1/185 |
| WO | WO-2020100931 A1 * | 5/2020 | B62D 1/184 |
| WO | WO-2020116350 A1 * | 6/2020 | B62D 1/184 |

* cited by examiner

STEERING DEVICE

CROSS REFERENCE TO RELATED APPLICATIONS

This application is a National Stage of International Application No. PCT/JP2021/012717 filed Mar. 25, 2021, claiming priority based on Japanese Patent Application No. 2020-059478 filed Mar. 30, 2020, the entire contents of which are incorporated by reference in their entirety.

FIELD

The present invention relates to a steering device.

BACKGROUND

A steering device disclosed in Patent Literature 1 includes a telescopic steering shaft supported by a cylindrical outer steering column. Accordingly, a position of a steering wheel can be changed in an axial direction of the steering shaft. The steering column also includes a lower column that is fixed to a vehicle body side and an upper column that supports the steering shaft. The upper column is slidably coupled to a lower shaft to be able to correspond to telescopic movement of the steering shaft.

The upper column by the steering device disclosed Patent Literature 1 is also restricted not to slide; thereby, a position of the steering wheel is secured in the axial direction. Specifically, the upper column disclosed in Patent Literature 1 includes a clamp that is externally slidably fitted to the lower column, a cylindrical part to which a bearing supporting the steering shaft is internally fitted, and a pair of protrusions that protrudes radially outward from an outer peripheral surface of the clamp. In addition, the steering device includes a bracket that includes a first side plate and a second side plate so that the clamp is interposed therebetween, and a fastening mechanism that fastens the first side plate and the second side plate. The fastening mechanism has a fastening shaft that penetrates the first side plate and the second side plate, and an operation lever that operates the fastening mechanism. A slit that has a groove width in a direction where the fastening shaft extends is provided in the clamp. The pair of protrusions is spaced apart from each other in the direction where the fastening shaft extends and is penetrated by the fastening shaft. In a case in which a fastening force of the fastening mechanism acts by the operation of the operation lever, the first side plate and the second side plate are brought close to each other along the fastening shaft. Thus, the pair of protrusions is fastened by the first side plate and the second side plate, and the groove width of the slit in the clamp is narrower. In other words, the clamp is deformed such that a diameter thereof is reduced to clamp the lower column disposed therein. As a result, the upper column is restricted not to slide, so that a position of the steering wheel is secured.

CITATION LIST

Patent Literature

Patent Literature 1: Japanese Patent Application Laid-open No. 2013-256193

SUMMARY

Technical Problem

In the upper column, the clamp is deformed during the operation of the operation lever, but the cylindrical part continuous with the clamp is not deformed. In other words, much stress is concentrated at a boundary between the clamp and the cylindrical part. For this reason, an upper column is provided with a rib near the boundary to improve a rigidity near the boundary.

However, in the case in which the rigidity near the boundary is improved, one end of the clamp continuous with the cylindrical part is difficult to be deformed. In addition, in a case of deforming the one end of the clamp continuous with the cylindrical part, a load on the operation lever increases, and the feel of operation of the operation lever is heavy. By contrast, in a case of deforming the other end of the clamp spaced apart from the cylindrical part, a load on the operation lever decreases, and the feel of operation of the operation lever is light. In other words, in a case in which the upper column slides to change a position fastened by the fastening mechanism, the feel of operation of the operation lever is changed, which gives an operator a sense of discomfort.

The present disclosure has been made in view of the above problem, and an objective of the present disclosure is to provide a steering device that enables an operation lever to be operated with the same feel of operation even though an upper column slides to change a fastening position of the fastening mechanism.

Solution to Problem

According to one aspect of the present disclosure, there is provided a steering device comprising: a telescopic steering shaft that extends in a first direction; a steering column that includes a lower column and an upper column that are configured to be relatively slidably coupled to each other in the first direction; a bracket including a first side plate and a second side plate configured to sandwich the steering column from a second direction orthogonal to the first direction; and a fastening mechanism that has an operation lever and a fastening shaft penetrating the first side plate and the second side plate and configured to fasten the first side plate and the second side plate, wherein the upper column includes: a clamp that has a slit extending in the first direction and that is configured to be externally slidably fitted to the lower column; a cylindrical part that extends from the clamp and that is configured to support the steering shaft; a pair of protrusions between which the slit is interposed, each of the protrusions protruding radially outward from the clamp and being provided with long groove into which the fastening shaft is inserted; and contact ribs that protrude from an outer peripheral surface of the clamp or side surfaces of the pair of protrusions and that are brought into contact with the first side plate and the second side plate fastened by the fastening mechanism, the clamp includes: a continuous clamp that is positioned near the cylindrical part and that is continuous with the cylindrical part; and a spaced clamp that is spaced apart from the cylindrical part, each of the protrusions includes: a continuous protrusion that protrudes from the continuous clamp; and a spaced protrusion that protrudes from the spaced clamp, the contact ribs include: a pair of first contact ribs each of which is disposed on the outer peripheral surface of the clamp and extends across the continuous clamp and the spaced clamp; a pair of second contact ribs each of which is disposed on a side surface of the protrusion and disposed opposite to the first contact rib with respect to the long groove, and extends across the continuous protrusion and the spaced protrusion; and at least one third contact rib that is disposed on a side surface of the spaced protrusion and disposed between the first contact rib and the long groove, and the at least one third contact rib has a protrusion amount greater than those of the first contact rib and the second contact rib.

The first side plate and the second side plate are brought close to the pair of protrusions by fastening of the fastening mechanism. Here, in a case in which the pair of protrusions interposed between the first side plate and the second side plate is a pair of the continuous protrusions, the first side plate and the second side plate come into contact with first contact ribs and second contact ribs. In addition, fastening of the fastening mechanism further causes the first side plate and the second side plate to press against the first contact ribs and the second contact ribs. Moreover, in the first side plate and the second side plate, the part between the portion brought in contact with the first contact rib and the portion brought in contact with the second contact rib is bent toward the upper column. Therefore, the operation force of the operation lever is used to deform the first side plate and the second side plate, which makes the feel of operation of the operation lever, normally heavy, becomes light. Meanwhile, in a case in which the pair of the protrusions interposed between the first side plate and the second side plate is a pair of the spaced protrusions, the second side plate is first brought into contact with a third contact rib, and then brought into contact with the first contact rib and the second contact rib. Accordingly, a load is started to be applied to the operation lever at a stage where the operation amount of the operation lever is small, and the feel of operation of the operation lever is heavy. In addition, more fastening of the fastening mechanism causes the first side plate and the second side plate to press against the first contact ribs, the second contact ribs, and the third contact rib, thereby, a pair of the spaced protrusions is fastened. Here, the first side plate or the second side plate is brought into contact with the third contact rib between the portion in contact with the first contact rib and the portion in contact with the second contact rib, so that the first side plate or the second side plate is not bent. Thus, the factor that makes the feel of operation of the operation lever lighter is eliminated. As described above, according to the steering device of the present disclosure, the feel of operation is lighter in a case in which the continuous clamp is fastened, and the feel of operation is heavier in a case in which the spaced clamp is fastened. Therefore, the difference in the feel of operation of the operation lever is small, which less causes discomfort to the operator.

Preferably, in one aspect of the steering device described above, the at least one third contact rib is a single contact rib, the second side plate has a lower rigidity than that of the first side plate, the pair of protrusions includes a first protrusion facing the first side plate and a second protrusion facing the second side plate, the third contact rib is disposed on the second protrusion, the contact ribs further include a single fourth contact rib that protrudes from a side surface of the first protrusion, and the fourth contact rib is disposed on a side surface of the spaced protrusion and between the first contact rib and the long groove, and has a protrusion amount equal to those of the first contact rib and the second contact rib.

In a case in which the first side plate presses against the first contact rib and the second contact rib, the first side plate is brought into contact with a fourth contact rib between the portion brought into contact with the first contact rib and the portion brought into contact with the second contact rib, so that the first side plate is not bent. Thus, the factor that makes the feel of operation of the operation lever lighter is eliminated, and the feel of operation in the case in which the spaced clamp is fastened can be made further heavier. The second side plate having a lower rigidity is brought into contact with the third contact rib. In a case in which the first side plate having a higher rigidity is brought into contact with the third contact rib after brought into contact with the third contact rib, the first side plate may not be deformed and may not press against the first contact rib and the second contact rib. Thus, according to the present disclosure, after brought into contact with the third contact rib, the second side plate is deformed, and reliably presses against the first contact ribs and the second contact ribs.

Advantageous Effects of Invention

The steering device of the present disclosure enables the operation lever to be operated with the same feel of operation even though the upper column slides to change the fastening position of the fastening mechanism.

DESCRIPTION OF EMBODIMENTS

Hereinafter, the present invention is described in detail with reference to the drawings. The present invention is not limited to the following embodiment (hereinafter referred to as an "embodiment"). In addition, components in the following embodiment include components capable of being readily assumed by those skilled in the art, components substantially identical, and components within the so-called equal range. Furthermore, the components disclosed in the following embodiment can be combined as appropriate.

Figure 1:
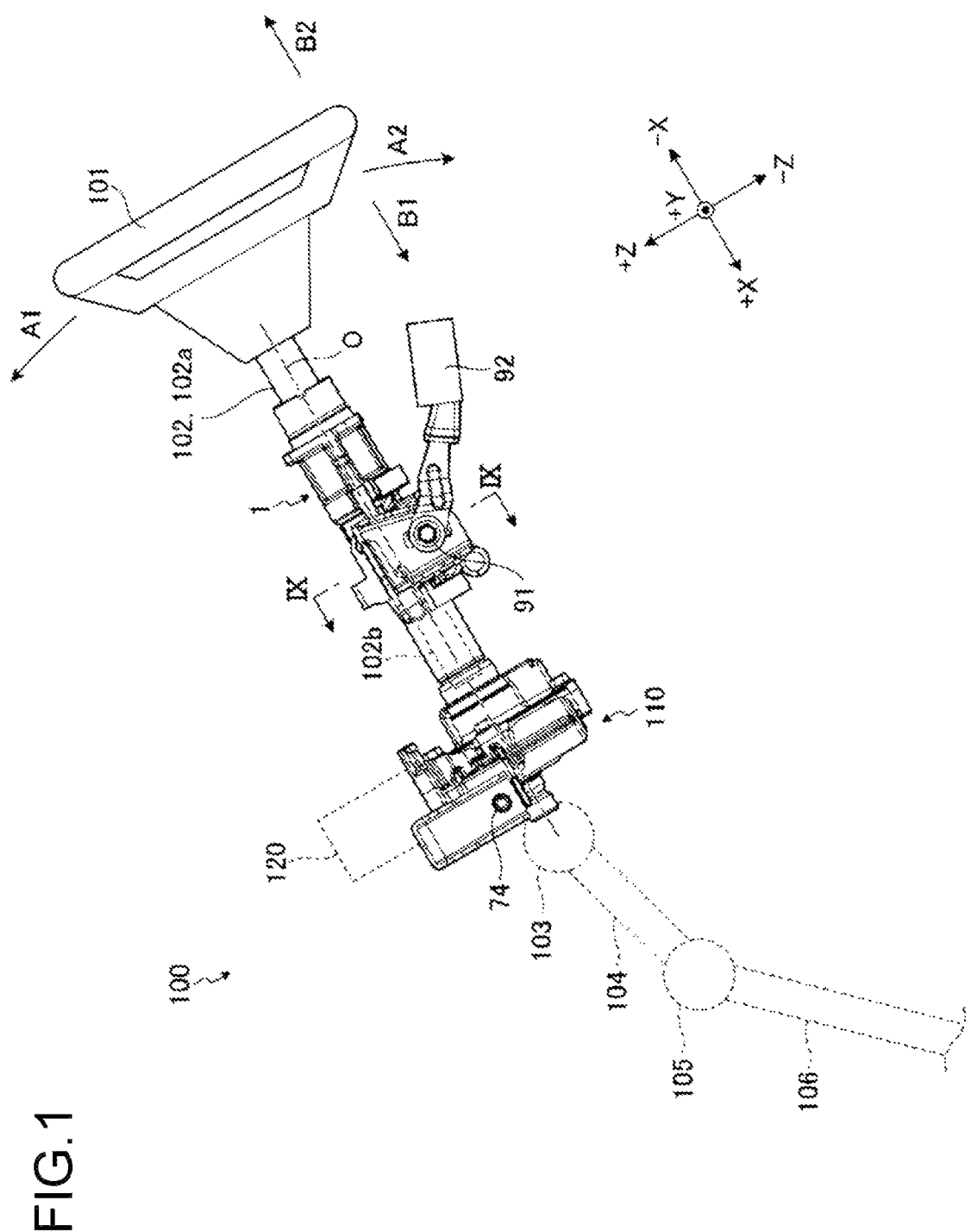
FIG. 1 is a side view of a steering device of the present embodiment.
Figure 2:
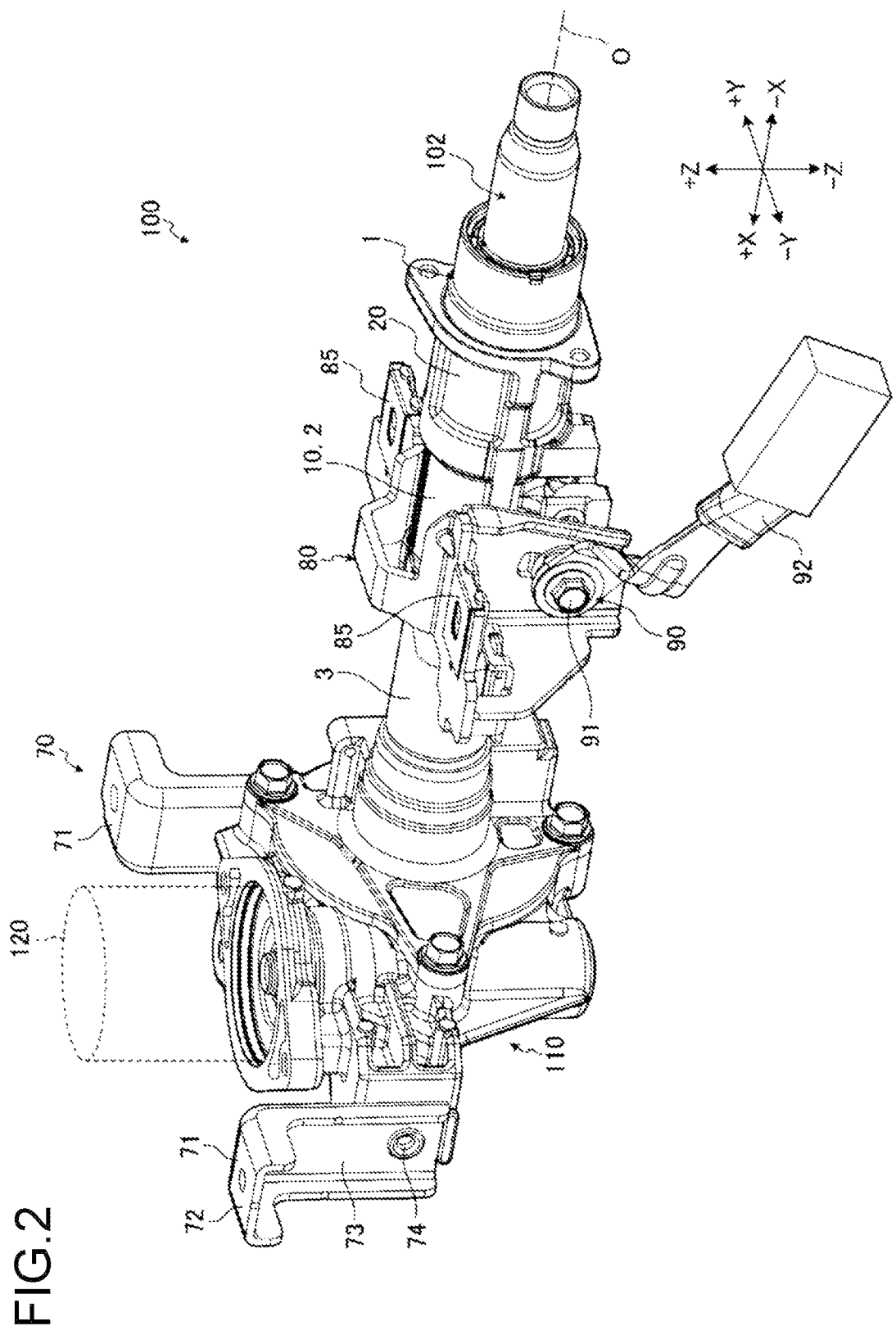
FIG. 2 is a perspective view of the steering device of the present embodiment.
Figure 3:
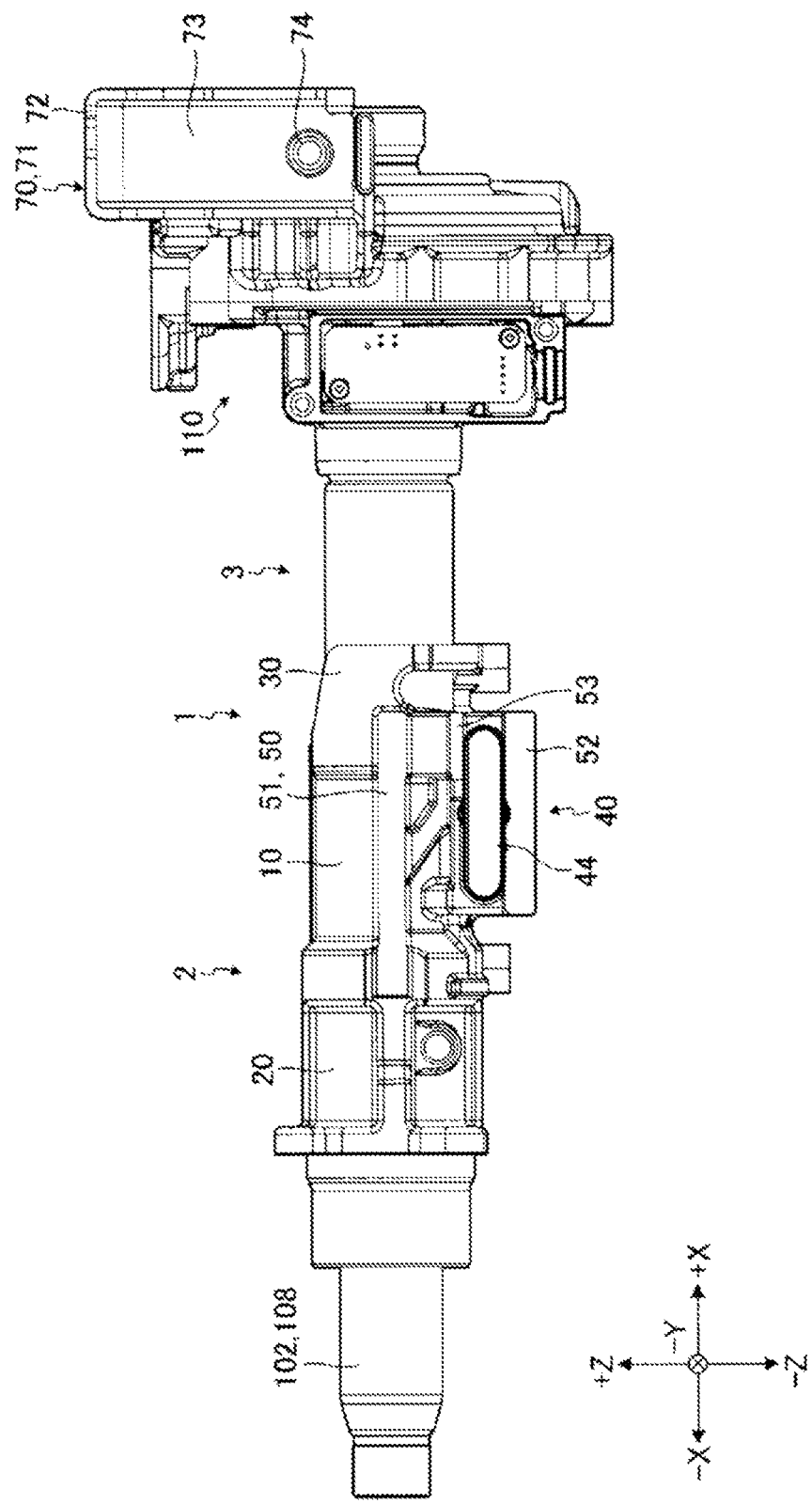
FIG. 3 is a side view of the steering device of the present embodiment.
Figure 4:
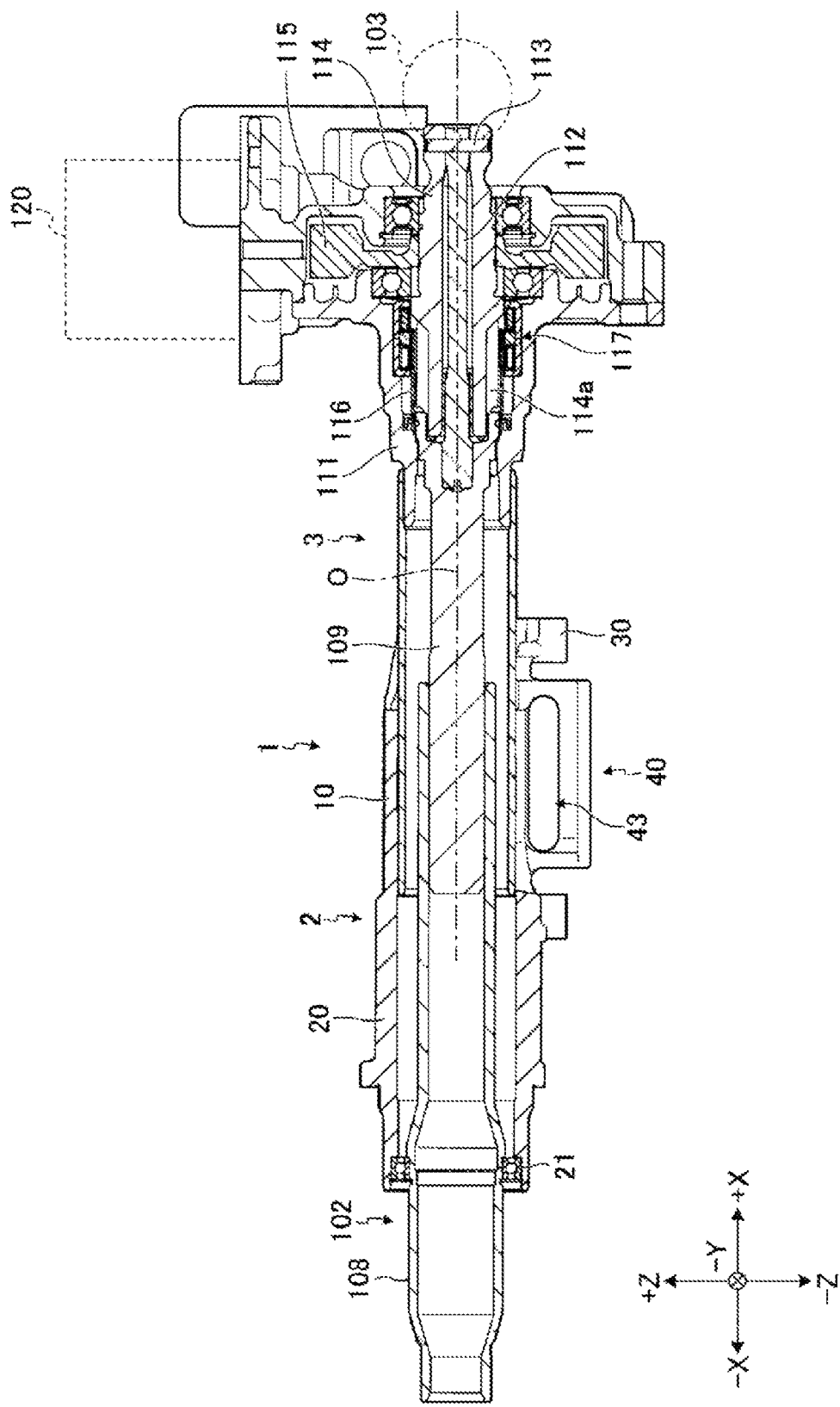
FIG. 4 is a cross-sectional view of the steering device cut along an axis illustrated in FIG. 3.
Figure 5:
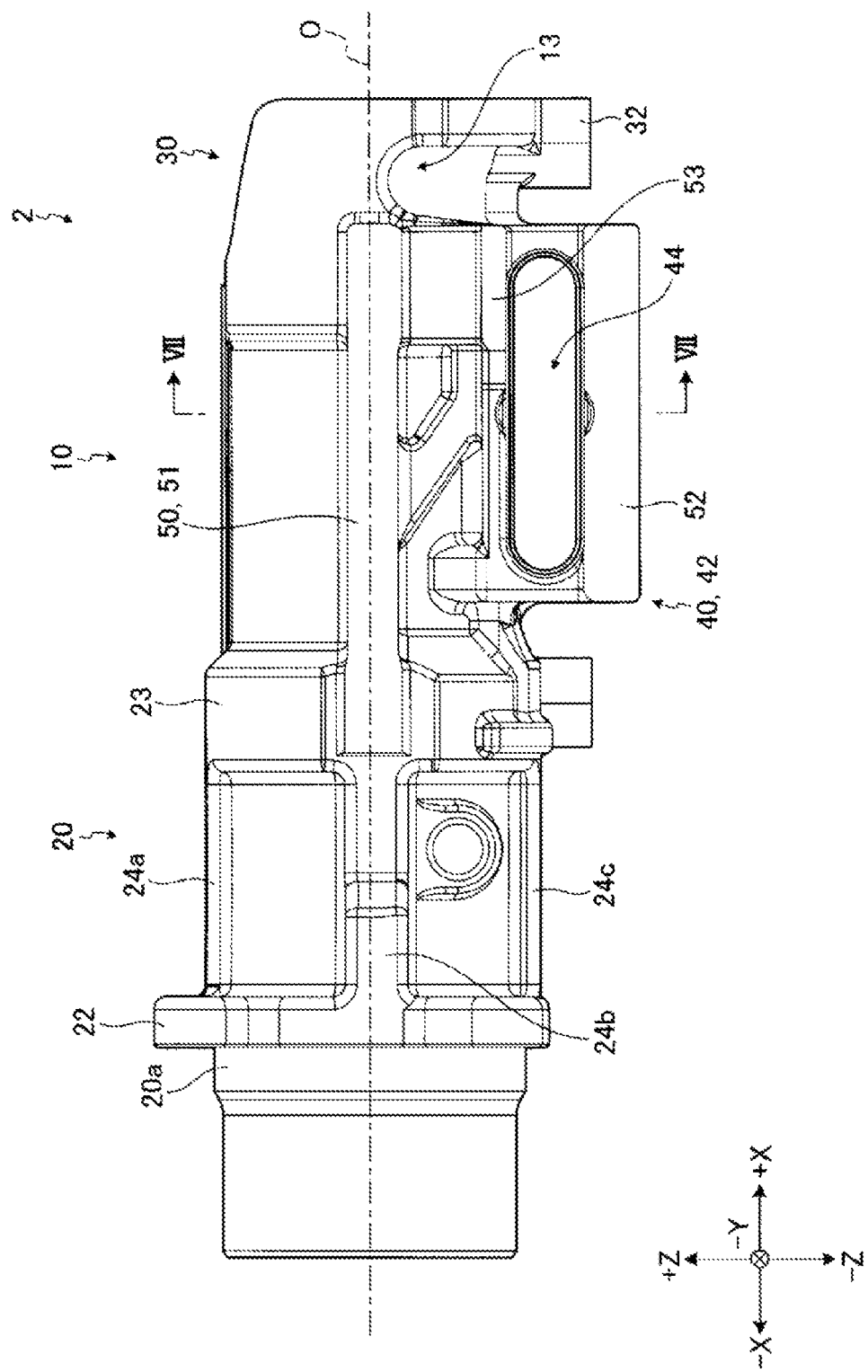
FIG. 5 is a side view of an upper column of the present embodiment.
Figure 6:
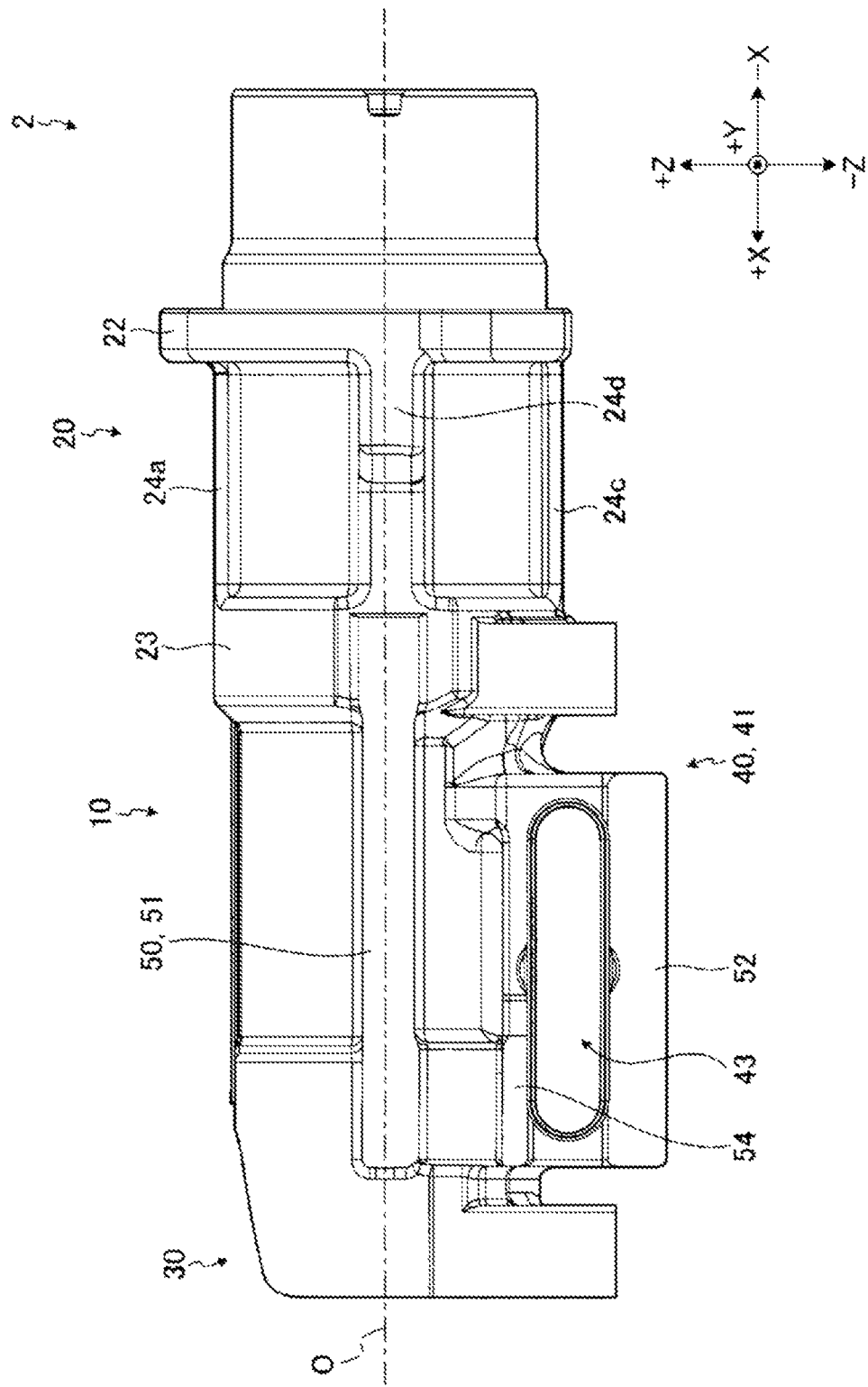
FIG. 6 is a side view of the upper column of the present embodiment.
Figure 7:
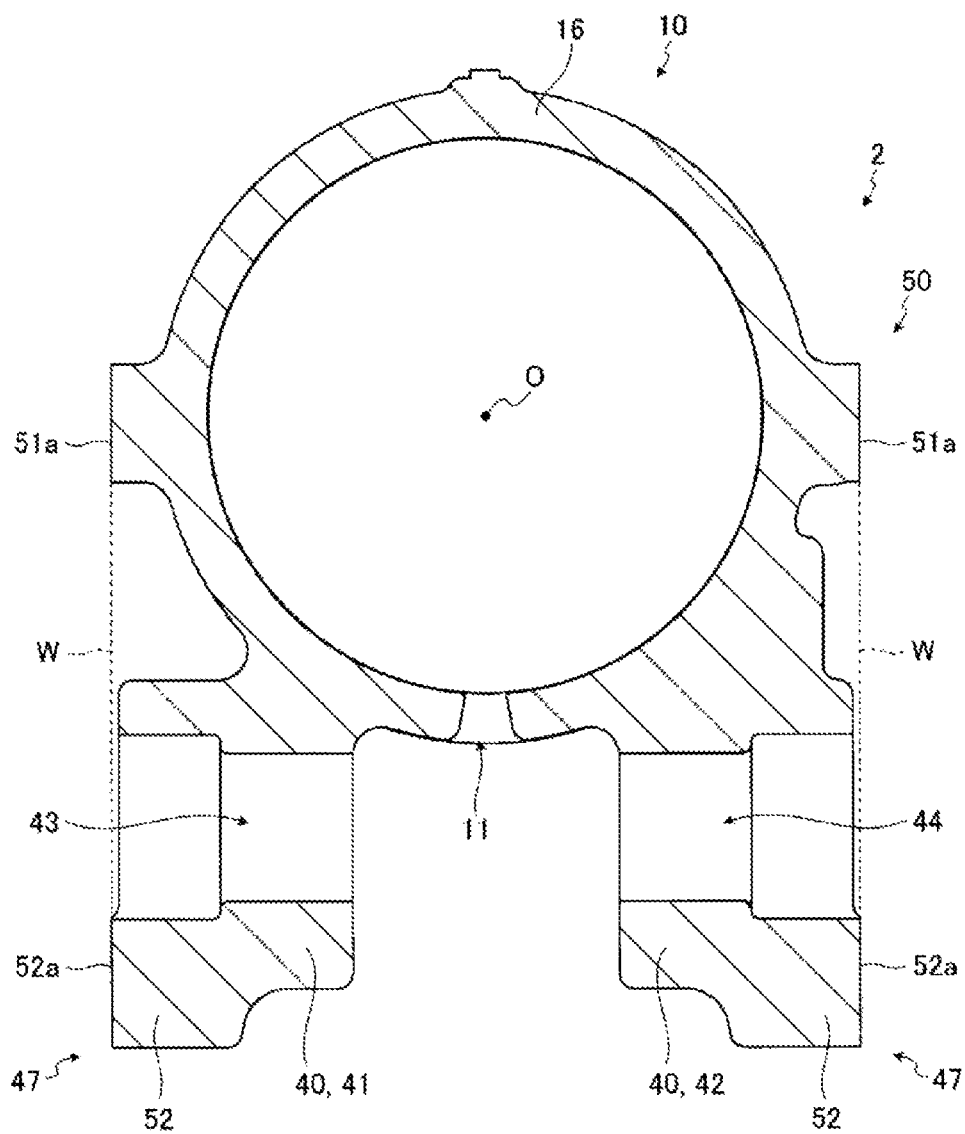
FIG. 7 is a cross-sectional view cut along VII-VII arrow line illustrated in FIG. 5.
Figure 7:
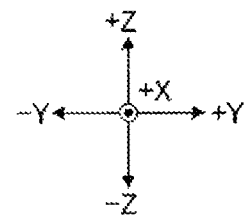
Figure 8:
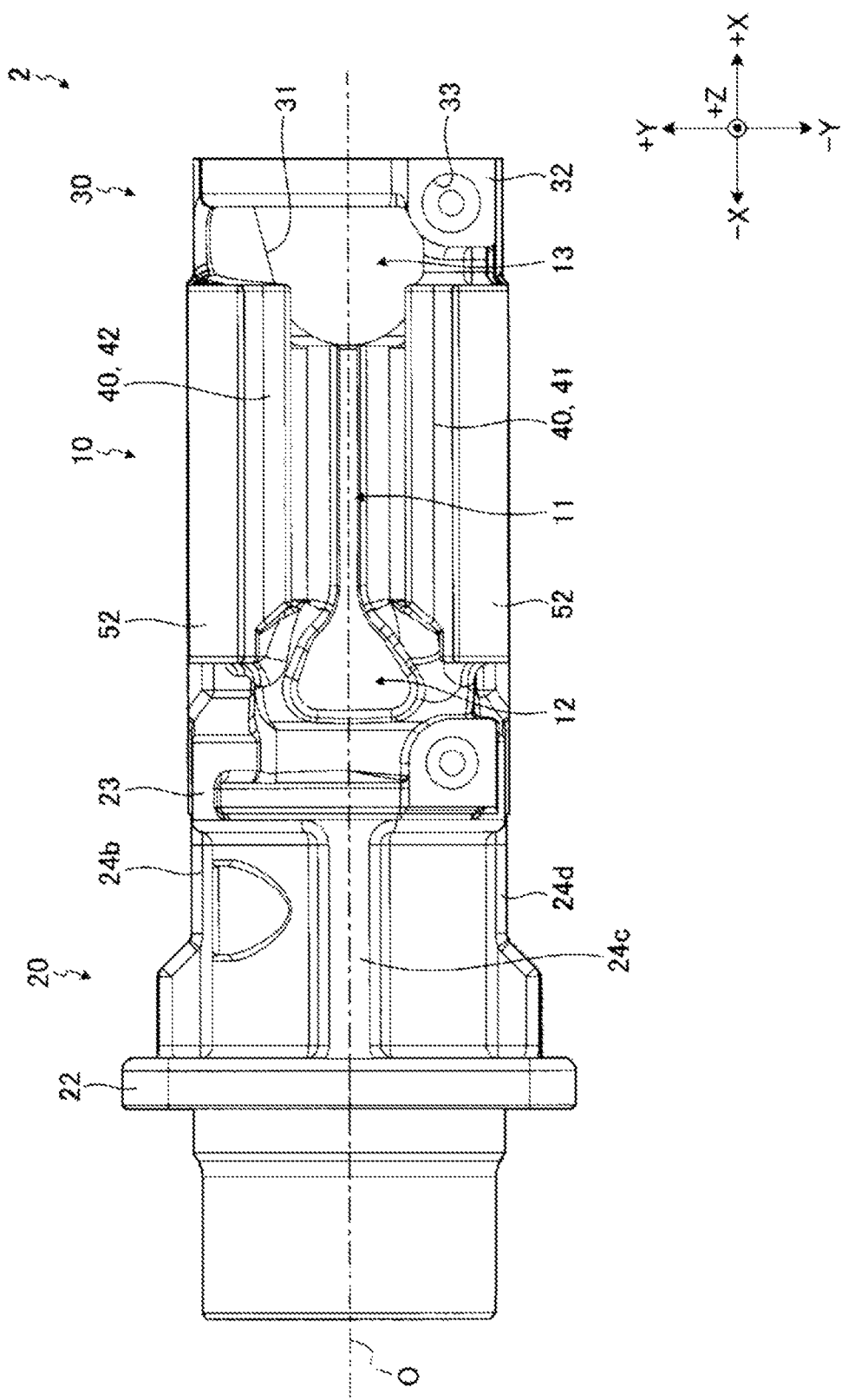
FIG. 8 is a bottom view of the upper column of the present embodiment.
Figure 9:
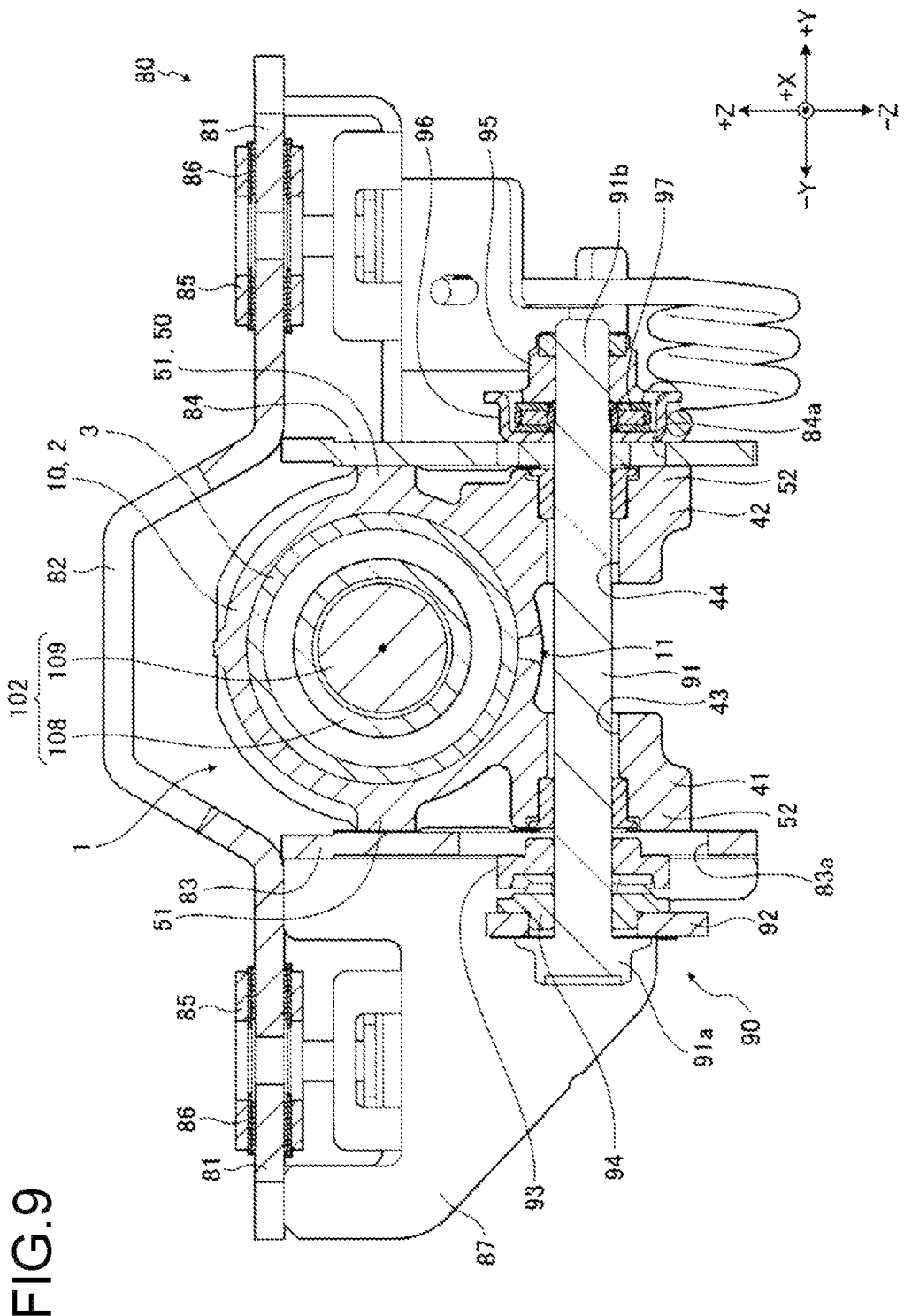
FIG. 9 is a cross-sectional view cut along IX-IX arrow line illustrated in FIG. 1.
Figure 10:
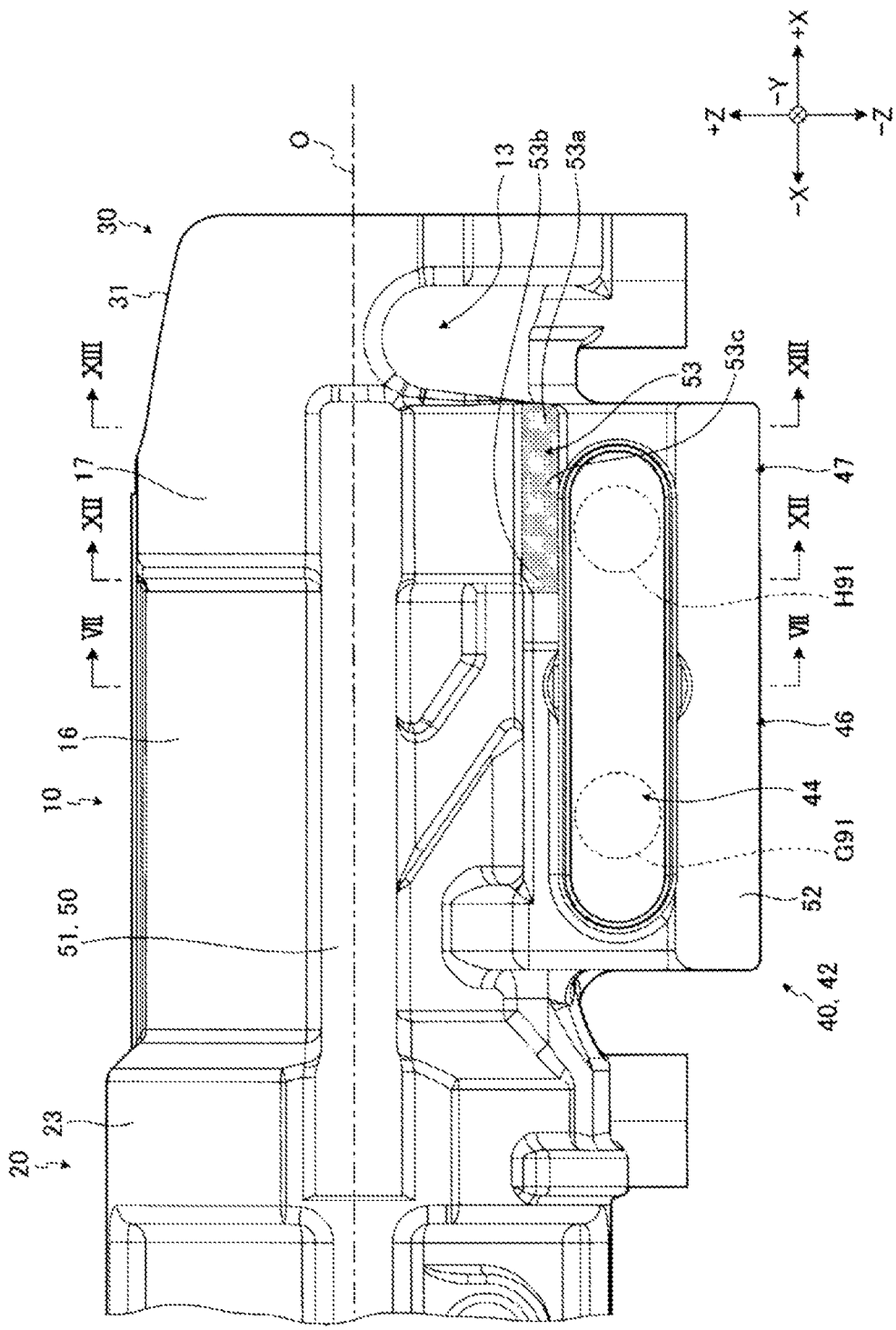
FIG. 10 is an enlarged side view of a part of FIG. 5 enlarged.
Figure 11:
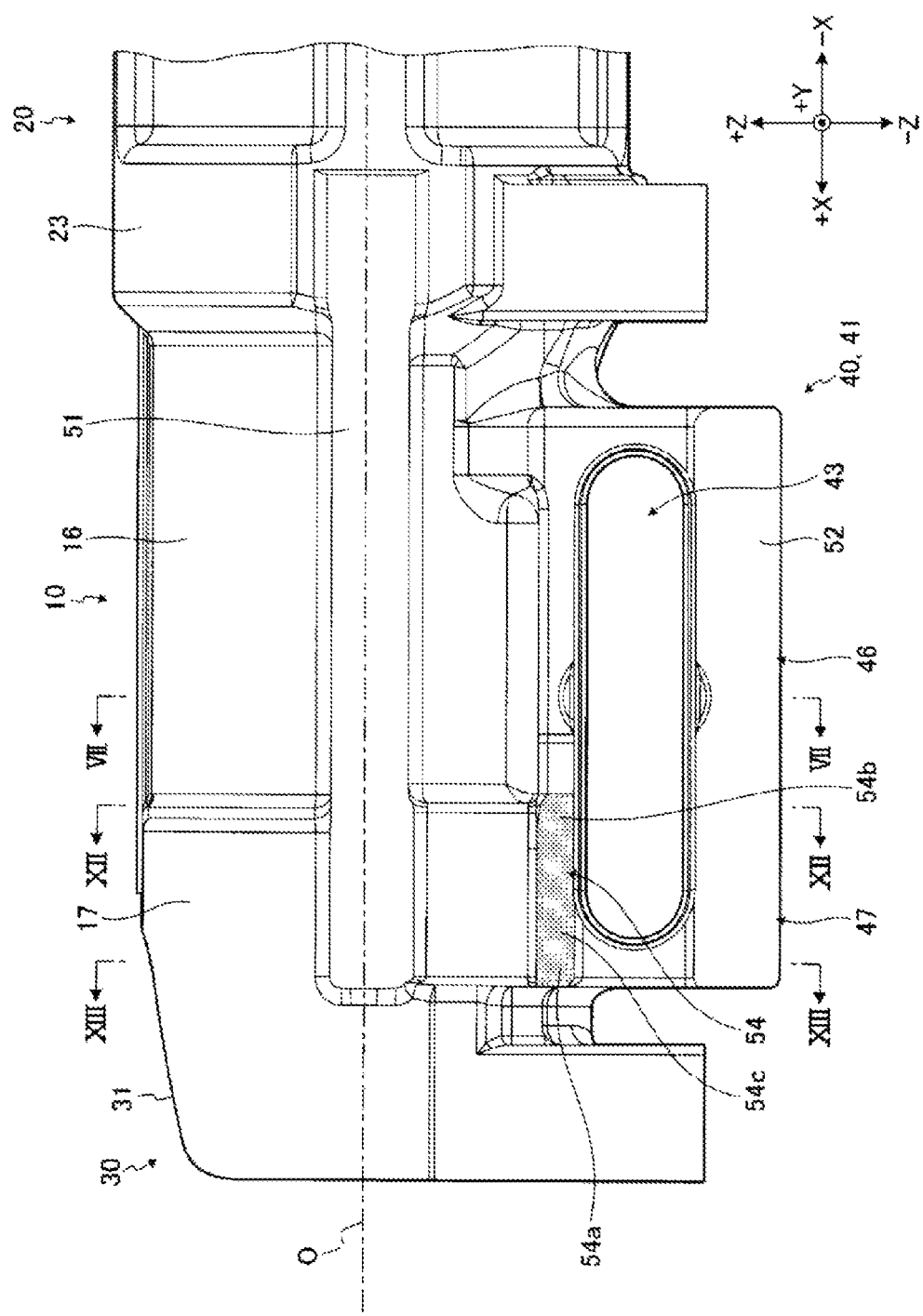
FIG. 11 is an enlarged side view of a part of FIG. 6 enlarged.
Figure 12:
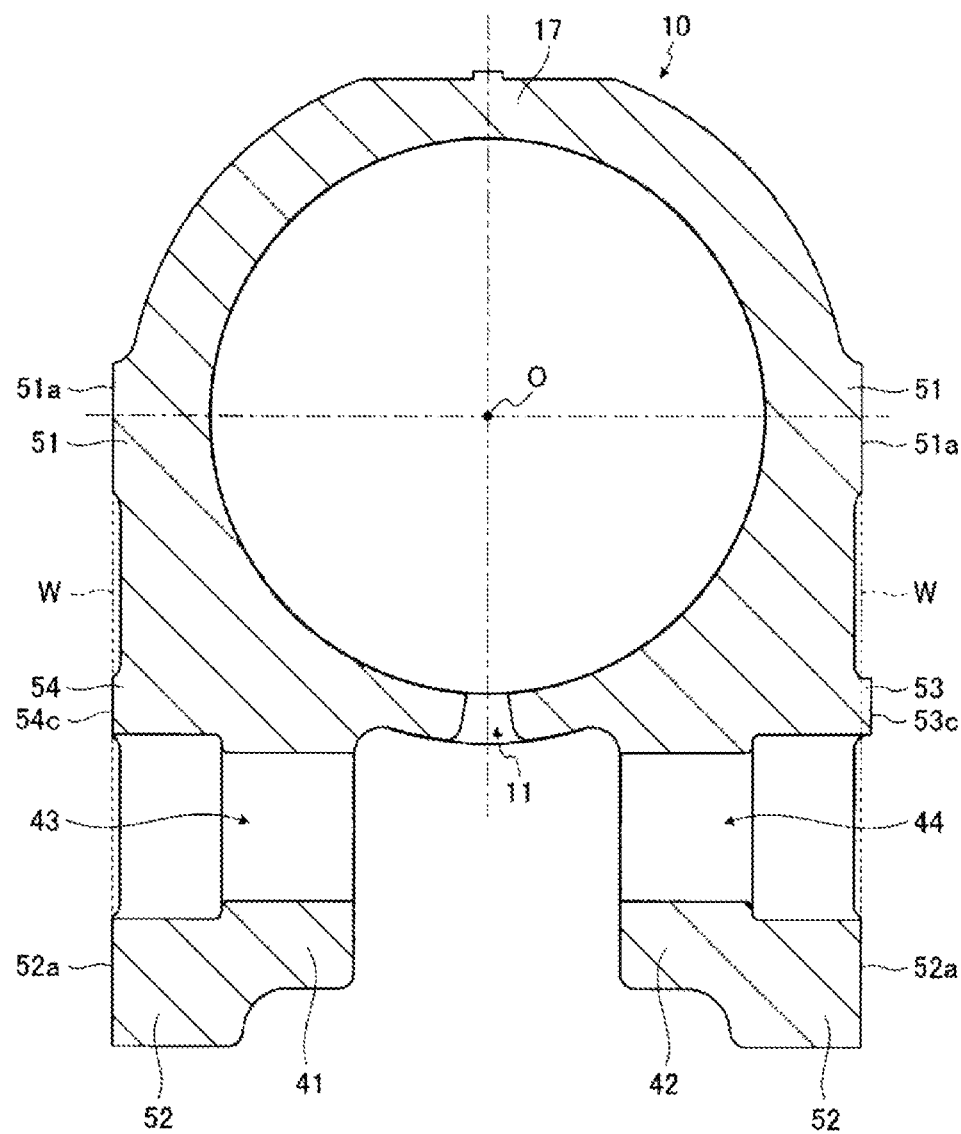
FIG. 12 is a cross-sectional view cut along XII-XII arrow line illustrated in FIG. 10.
Figure 12:
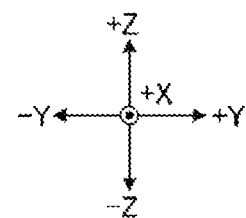
Figure 13:
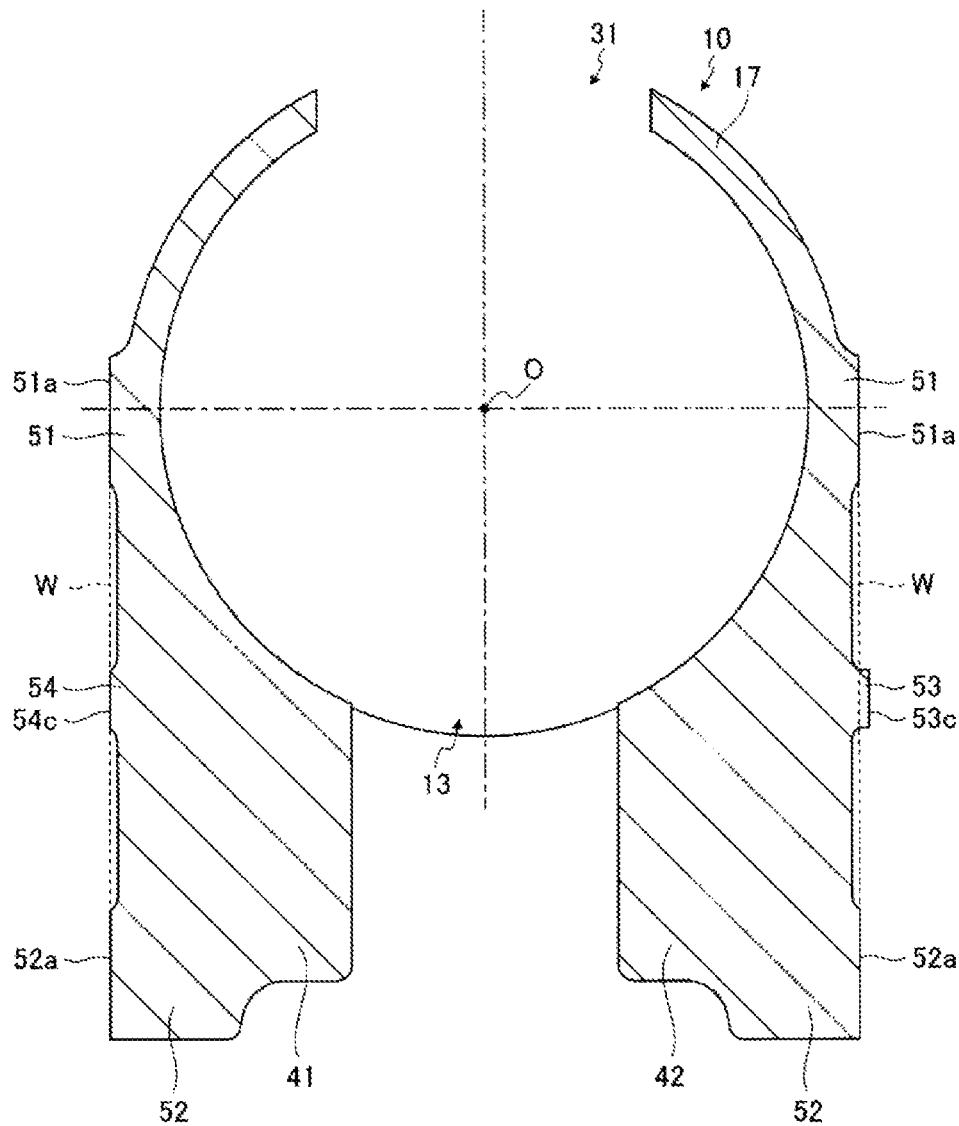
FIG. 13 is a cross-sectional view cut along XIII-XIII arrow line illustrated in FIG. 10.
Figure 13:
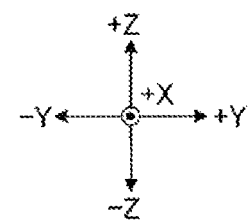
Figure 14:
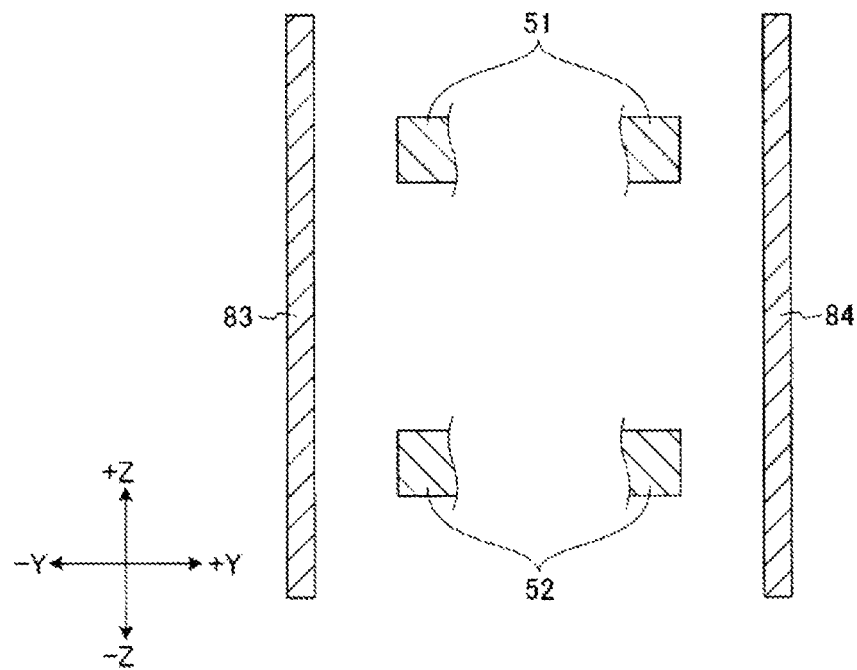
FIG. 14 is a cross-sectional view illustrating a clamp having a high rigidity before the clamp is fastened.
Figure 15:
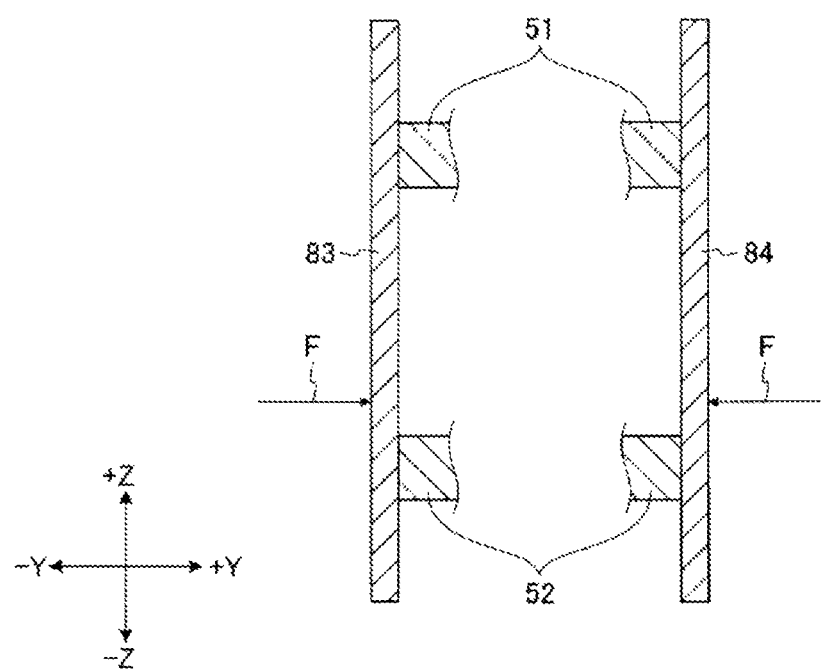
FIG. 15 is a diagram illustrating the clamp having a high rigidity immediately after fastening is started.
Figure 16:
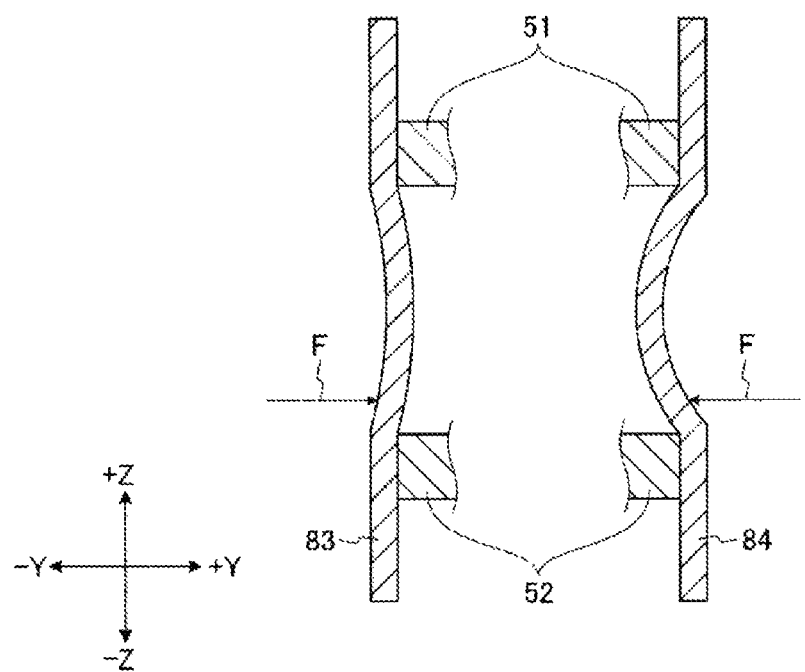
FIG. 16 is a diagram illustrating a case in which the clamp having a high rigidity has been fastened, and illustrating a state in which a first side plate and a second side plate press against first contact ribs and second contact ribs.
Figure 17:
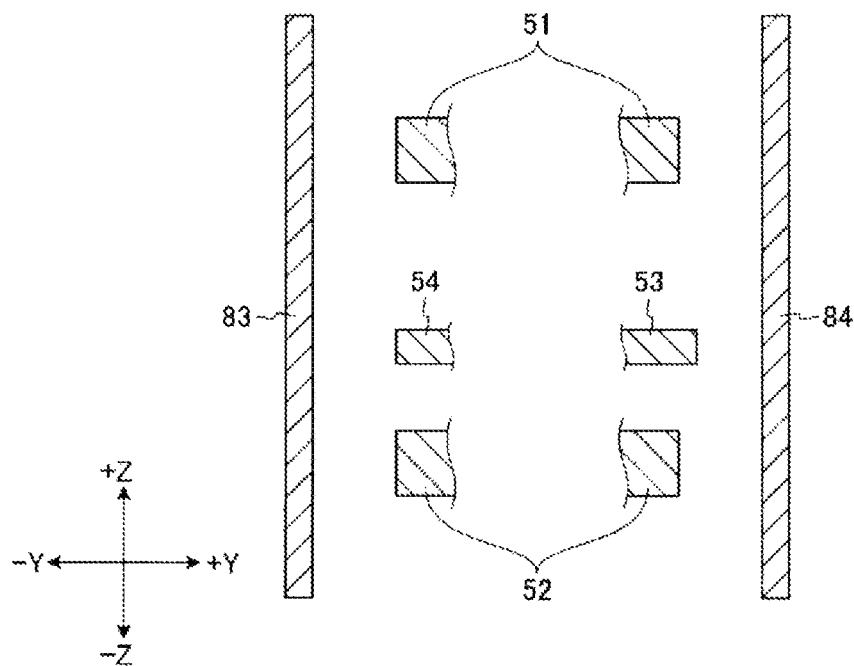
FIG. 17 is a cross-sectional view illustrating a clamp with a low rigidity before the clamp is fastened.
Figure 18:
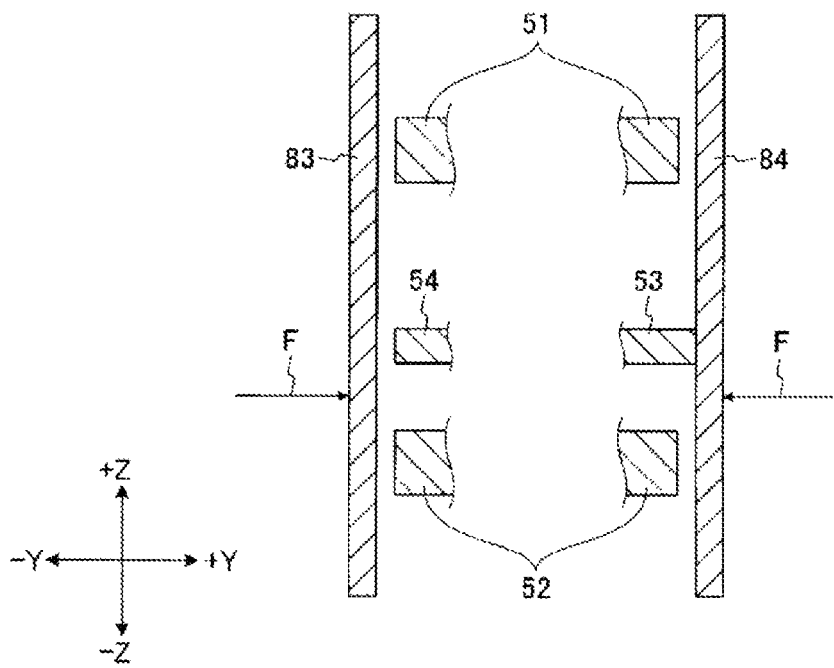
FIG. 18 is a diagram illustrating the clamp having a low rigidity immediately after fastening is started.
Figure 19:
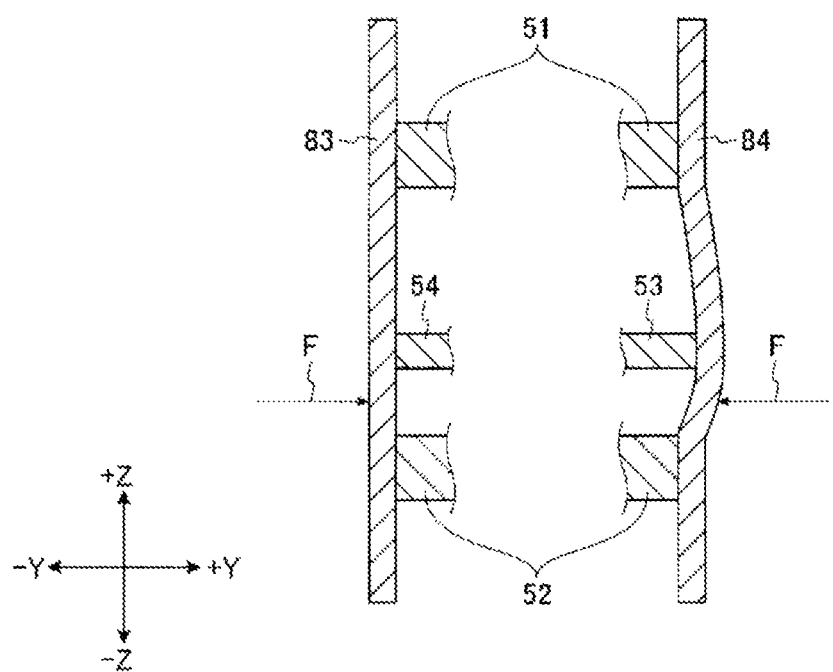
FIG. 19 is a diagram illustrating a case in which the clamp having a low rigidity has been fastened, and illustrating a state in which the first side plate and the second side plate press against the first contact ribs and the second contact ribs.

FIG. 1 is a side view of a steering device of the present embodiment. FIG. 2 is a perspective view of the steering device of the present embodiment. FIG. 3 is a side view of the steering device of the present embodiment. FIG. 4 is a cross-sectional view of the steering device cut along an axis illustrated in FIG. 3. FIG. 5 is a side view of an upper column of the present embodiment. FIG. 6 is a side view of the upper column of the present embodiment. FIG. 7 is a cross-sectional view cut along VII-VII arrow line illustrated in FIG. 5. FIG. 8 is a bottom view of the upper column of the present embodiment. FIG. 9 is a cross-sectional view cut along IX-IX arrow line illustrated in FIG. 1. FIG. 10 is an enlarged side view of a part of FIG. 5 enlarged. FIG. 11 is an enlarged side view of a part of FIG. 6 enlarged. FIG. 12 is a cross-sectional view cut along XII-XII arrow line illustrated in FIG. 10. FIG. 13 is a cross-sectional view cut along XIII-XIII arrow line illustrated in FIG. 10. FIG. 14 is a cross-sectional view illustrating a clamp having a high rigidity before the clamp is fastened. FIG. 15 is a diagram illustrating the clamp having a high rigidity immediately after fastening is started. FIG. 16 is a diagram illustrating a case in which the clamp having a high rigidity has been fastened, and illustrating a state in which a first side plate and a second side plate press against a first contact ribs and a second contact ribs. FIG. 17 is a cross-sectional view illustrating a clamp with a low rigidity before the clamp is fastened. FIG. 18 is a diagram illustrating the clamp having a low rigidity immediately after fastening is started. FIG. 19 is a diagram illustrating a case in which the clamp having a low rigidity has been fastened, and illustrating a state in which the first side plate and the second side plate press against the first contact ribs and the second contact ribs.

First, a basic configuration of a steering device 100 is described. As illustrated in FIG. 1, the steering device 100 includes a steering wheel 101, a steering shaft 102, a first universal joint 103, an intermediate shaft 104, a second universal joint 105, and a pinion shaft 106.

The steering wheel 101 is attached to one end 102a of the steering shaft 102. In a case in which a driver operates the steering wheel 101, the steering shaft 102 rotates around an axis 0, and an operation torque is applied to the steering shaft 102.

A gearbox 110 is interposed between the other end 102b of the steering shaft 102 and the first universal joint 103. An electric motor 120 is assembled with the gearbox 110 to apply an assist torque to the steering shaft 102. In other words, the steering device 100 of the present embodiment is an electric power steering device that assists steering of the driver by using the electric motor 120. The present invention may be applied to a steering device without the gearbox 110.

One end of the intermediate shaft 104 is coupled to the first universal joint 103. The pinion shaft 106 is coupled to the other end of the intermediate shaft 104 through the second universal joint 105. As described above, the operation torque of the steering shaft 102 is transmitted to the pinion shaft 106 through the first universal joint 103, the intermediate shaft 104, and the second universal joint 105.

As illustrated in FIG. 2, the steering device 100 further includes a steering column 1, a first bracket 70, a second bracket 80, and a fastening mechanism 90, in addition to the above-mentioned components. Next, the details of each component of the steering device 100 will be described. The XYZ Cartesian coordinate system is used in the following description. An X axis is parallel to the axis 0 of the steering shaft 102. A Y axis is parallel to a vehicle width direction of a vehicle on which the steering device 100 is mounted. A Z axis is perpendicular to both the X and Y axes. A direction parallel to the X axis is described as the X direction, a direction parallel to the Y axis is described as the Y direction, and a direction parallel to the Z axis is described as the Z direction. A direction toward the front of the vehicle in the X direction is a +X direction. In a case in which an operator faces the +X direction, the right direction is a +Y direction. The upward direction in the Z direction is a +Z direction. The X direction may be referred to as a first direction, and the Y direction may be referred to as a second direction.

As illustrated in FIG. 3, the steering shaft 102 is assembled in a state of protruding from an end of the steering column 1 in a −X direction. As illustrated in FIG. 4, the steering shaft 102 has an upper shaft 108 that is a cylindrical shaft, and a lower shaft 109 that is a solid shaft. The steering wheel (see FIG. 1) is attached to an end of the upper shaft 108 in the −X direction. An end of the upper shaft 108 in the +X direction is externally fitted to the lower shaft 109. The end of the upper shaft 108 in the +X direction and an end of the lower shaft 109 in the −X direction are spline-fitted to each other. Therefore, the upper shaft 108 can slide on the lower shaft 109 in the X direction.

An end of the lower shaft 109 in the +X direction enters an inside of a housing 111 of the gearbox 110. A torsion bar 112, an output shaft 114 that is an outer cylinder of the torsion bar 112, and a worm wheel 115 that is externally fitted to the output shaft 114 are provided inside the housing 111 of the gearbox 110. The worm wheel 115 is engaged with a worm (not illustrated) that is coupled to an output shaft of the electric motor 120. Therefore, in a case in which the electric motor 120 is driven, a torque is applied to the output shaft 114.

The end of the lower shaft 109 in the +X direction is coupled to an end of the torsion bar 112 in the −X direction. An end of the torsion bar 112 in the +X direction is coupled to the output shaft 114 by a fixing pin 113. The first universal joint 103 is coupled to an end of the output shaft 114 in the +X direction. Therefore, a steering torque of the lower shaft 109 is transmitted to the intermediate shaft 104 (see FIG. 1) through the torsion bar 112, the output shaft 114, and the first universal joint 103. The torsion bar 112 twists in response to the steering torque of the lower shaft 109, so that an angular difference in rotation between the lower shaft 109 and the output shaft 114 is made.

In order to eliminate the angular difference in rotation between the lower shaft 109 and the output shaft 114, a torque detection groove 114a is formed at an end of the output shaft 114 in the −X direction. A cylindrical member 116 is disposed on an outer peripheral side of the torque detection groove 114a. The cylindrical member 116 is fixed to the end of the lower shaft 109 in the +X direction and is integrally rotated with the lower shaft 109. The cylindrical member 116 has multiple windows (not illustrated) penetrating in a radial direction. A torque sensor 117 is disposed on an outer peripheral side of the cylindrical member 116.

The torque sensor 117 transmits a detection result to a torque detection circuit board (not illustrated) that is provided inside the housing 111, and the torque detection circuit board detects the angular difference in rotation between the lower shaft 109 and the output shaft 114. The torque detection circuit board causes the electric motor 120 to be driven based on the detection result to provide a steering assist torque to the output shaft 114. As a result, the same angle in rotation between the lower shaft 109 and the output shaft 114 is achieved.

As illustrated in FIG. 2, the first bracket 70 includes a pair of support pieces 71 and 71. The support pieces 71 are spaced apart from each other in the Y direction. Each of the support pieces 71 includes an attachment plate 72 extending in the X direction and the Y direction and a support plate 73 extending in the X direction and the Z direction. The attachment plate 72 is fixed to a vehicle body by a bolt (not illustrated). A pivot shaft 74 extending in the Y direction is rotatably provided at an end of the support plate 73 in the −Z direction. The gearbox 110 is fixed to the pivot shaft 74. Thus, the gearbox 110, the steering shaft 102, the steering column 1, and the steering wheel 101 are supported by the first bracket 70 to be able to rotate around the pivot shaft 74 (see arrows A1 and A2 in FIG. 1).

As illustrated in FIG. 4, the steering column 1 is an outer cylinder that extends in the X direction and surrounds the steering shaft 102. The steering column 1 includes an upper column 2 that is a column disposed near the steering wheel 101, and a lower column 3 that is a column disposed in the—±X direction with respect to the upper column 2, and that is spaced apart from the steering wheel 101. The lower column 3 has a cylindrical shape. An end of the lower column 3 in the ±X direction is externally fitted to the housing 111 of the gearbox 110.

The upper column 2 is produced by casting. As illustrated in FIGS. 3, 4, 5, and 6, the upper column 2 includes a clamp 10 that is externally fitted to the lower column 3, a cylindrical part 20 that extends from the clamp in the −X direction, an attachment part 30 that is provided at an end of the clamp 10 in the +X direction, a pair of protrusions 40 and 40 (only one protrusion is illustrated in FIG. 5, see FIG. 6) that protrudes in the −Z direction from the outer peripheral surface of the clamp and contact ribs 50 (see FIGS. 3, 5, and 6) that extend in the X direction.

The cylindrical part 20 has a circular inner peripheral surface. An inner diameter of the cylindrical part 20 has a size enough to allow the lower column 3 to enter the inside. A bearing 21 is internally fitted to an end of the cylindrical part 20 in the −X direction. The cylindrical part 20 rotatably supports the upper shaft 108 by using the bearing 21. In addition, an opening at the end of the cylindrical part 20 in the −X direction is blocked by the bearing 21 and the upper shaft 108.

As illustrated in FIGS. 5 and 6, a first annular rib 22 and a second annular rib 23 that are disposed to be spaced apart from each other in the X direction are provided on an outer peripheral surface 20a of the cylindrical part 20. Four straight linear ribs 24a, 24b, 24c, and 24d that extend in the X direction are provided at a 90-degree interval on the outer peripheral surface 20a of the cylindrical part 20 and between the first annular rib 22 and the second annular rib 23. Thus, the rigidity of the cylindrical part 20 is very high. The second annular rib 23 is provided at the boundary between the clamp 10 and the cylindrical part 20.

As illustrated in FIG. 7, the clamp 10 is provided with a slit 11. As illustrated in FIG. 8, the slit 11 of the clamp 10 extends in the X direction. Therefore, the clamp 10 has a circular arc-shaped cross-section and extends in the X direction. While no external force acts on the clamp 10, the inner diameter of the clamp 10 is approximately the same in size as the outer diameter of the lower column 3. In other words, the clamp 10 is slidable on the lower column 3.

As illustrated in FIG. 7, the slit 11 of the clamp 10 is positioned in the −Z direction as viewed from the axis O. Therefore, a groove width of the slit 11 is along the Y direction. According to this, in a case in which a compressive load for fastening the clamp 10 from the Y direction acts on the clamp 10, the clamp 10 deforms so that the groove width of the slit 11 is narrower. In other words, the clamp 10 clamps the lower column 3 disposed therein by reducing its diameter. As a result, high frictional force acts between an inner peripheral surface of the clamp 10 and an outer peripheral surface of the lower column 3 to restrict the sliding of the upper column 2.

As illustrated in FIGS. 8 and 10, a part of the attachment part 30 in the +Z direction includes a cut-out portion 31. As illustrated in FIG. 8, the attachment part 30 wraps around the lower column 3 in an arc shape in the −Z direction. An attachment rib 32 is provided on an outer peripheral surface of the attachment part 30, which faces the −Z direction. The attachment rib 32 has a female thread hole 33. A bracket (not illustrated) that supports a harness or the like is attached to the female thread hole 33.

A first expansion slit 12 and a second expansion slit 13 whose groove widths are circumferentially wider than that of the slit 11 are provided at both ends of the slit 11 of the clamp 10 in the X direction. Parts of the clamp 10, which are not continuous with the adjacent cylindrical part 20 and the adjacent attachment part 30 in the X axis direction, increase by the first expansion slit 12 and the second expansion slit 13. As a result, the clamp 10 is less affected by the rigidity of the cylindrical part 20 and the attachment part 30 and is further easily deformable. Another configuration of the clamp 10 will be described later.

As illustrated in FIG. 8, the pair of protrusions 40 and 40 is disposed so that the slit is interposed therebetween as viewed from the −Z direction. Hereinafter, the one protrusion 40 of the pair of protrusions 40 and 40, which is disposed in the −Y direction relative to the slit 11, is referred to as a first protrusion 41, and the other protrusion 40 of the pair of protrusions 40 and 40, which is disposed in the +Y direction relative to the slit 11, is referred to as a second protrusion 42. The first protrusion 41 and the second protrusion 42 extend in the X direction with approximately the same length as that of the clamp 10. As illustrated in FIGS. 5 and 6, long grooves 43 and 44 extending in the X direction are provided. As illustrated in FIG. 7, the long grooves 43 and 44 penetrate in the Y direction.

As illustrated in FIGS. 5, 6, and 7, the contact ribs 50 each have a pair of first contact ribs 51 and 51, a pair of second contact ribs 52 and 52, a single third contact rib 53, and a single fourth contact rib 54. The first contact ribs 51 protrude from the outer peripheral surface of the clamp 10. The second contact ribs 52 are provided to protrude from outer surfaces of the first protrusion 41 and the second protrusion 42, respectively.

As illustrated in FIG. 5, the first contact ribs 51 and the second contact ribs 52 extend in a straight line in the X direction. The first contact ribs 51 overlap the axis O as viewed from the Y direction. Each end of each first contact rib 51 in the −X direction is continuous with a second annular rib 23. The second contact ribs 52 are positioned at ends of the first protrusion 41 and the second protrusion 42 in the −Z direction, respectively. The second contact ribs 52 extend along edges of the long grooves 43 and 44. As described above, the first contact ribs 51 and the second contact ribs 52 are disposed so that the long grooves 43 and 44 are interposed therebetween. The details of the contact ribs 50 including the single third contact rib 53 and the single fourth contact rib 54 will be described below.

As illustrated in FIG. 9, the second bracket 80 includes a pair of attachment plates 81 and 81, an upper plate 82, a first side plate 83, and a second side plate 84. The second bracket 80 may be referred to simply as a bracket.

The pair of attachment plates 81 and 81 is plate-like members that are disposed to be spaced apart from each other in the Y direction so that the steering column 1 is interposed therebetween. The attachment plates 81 are coupled to the vehicle body by using release capsules 85. Each of the release capsules 85 is disposed at an end of each of the attachment plates 81 in the −X direction. Each of the release capsules 85 is integrated with each of the attachment plates 81 by using each of resin members 86. The release capsules 85 are fixed to a member on the vehicle body side by bolts or the like. In a case in which a load in the +X direction acts on the steering column 1 due to a secondary collision of the vehicle (see arrow B1 in FIG. 1), the resin members 86 are sheared and only the attachment plates 81 move in the +X direction; thereby, the second bracket 80 is released from the vehicle body.

The upper plate 82 is a plate-like member that couples the pair of attachment plates 81 and 81 to each other. The first side plate 83 and the second side plate 84 are plate-like members that extend in the X direction and the Z direction. The first side plate 83 is disposed in the −Y direction relative to the clamp 10. The second side plate 84 is disposed in the +Y direction relative to the clamp 10. In other words, the first side plate 83 and the second side plate 84 are spaced apart from each other in the Y direction so that the clamp 10 of the steering column 1 is interposed therebetween. The first side plate 83 and the second side plate 84 are integrated with the pair of attachment plates 81 and 81, and the upper plate 82 by welding. The first side plate 83 and the second side plate 84 are formed with arc grooves 83a and 84a that extend in the Z direction, respectively. The arc grooves 83a and 84a have an arc shape centered on the pivot shaft 74 (see FIGS. 1, 2, and 3). A protruding plate 87 that protrudes in the −Y direction is provided at an end of the first side plate 83 in the ±X direction. Therefore, the first side plate 83 has a higher rigidity in the Y direction than the second side plate 84 does.

The fastening mechanism 90 is a device that fastens the clamp 10 to apply a compressive load to the clamp 10. The fastening mechanism 90 has a fastening shaft 91, an operation lever 92, a fixed cam 93, a rotating cam 94, a nut 95, a spacer 96, and a thrust bearing 97.

The fastening shaft 91 is a rod-shaped member. The fastening shaft 91 is inserted, from the −Y direction toward the +Y direction, into the arc groove 83a of the first side plate 83, the long grooves 43 and 44 of the clamp 10, and the arc groove 84a of the second side plate 84 in this order, and extends in the Y direction. An end of the fastening shaft 91 in the −Y direction is provided with a head 91a. The operation lever 92 is coupled near the end of the fastening shaft 91 in the −Y direction. The operation lever 92 extends from the fastening shaft 91 in the −X direction and can be operated by the driver in the vehicle (see FIGS. 1 and 2). In a case in which the driver rotates the operation lever 92 around the fastening shaft 91, the fastening shaft 91 is rotated in conjunction with the rotation of the operation lever 92.

The fixed cam 93 and the rotating cam 94 are disposed between the first side plate 83 and the operation lever 92 in a state of being penetrated by the fastening shaft 91. The fixed cam 93 is adjacent to the first side plate 83. A part of the fixed cam 93 is fitted to the arc groove 83a of the first side plate 83. Accordingly, the fixed cam 93 is not rotated in conjunction with the fastening shaft 91. The rotating cam 94 is adjacent to the operation lever 92. The rotating cam 94 is coupled to the operation lever 92 and is integrally rotated with the operation lever 92. Tilted planes are provided on surfaces of the fixed cam 93 and the rotating cam 94, which face each other, along the peripheral direction. In a case in which the rotating cam 94 is rotated by operation of the operation lever 92, the tilted plane of the fixed cam 93 rides up or rides down on the tilted plane of the rotating cam 94. As a result, a distance in the Y direction between the fixed cam 93 and the rotating cam 94 changes.

An end of the fastening shaft 91 in the +Y direction is provided with a male thread 91b. This male thread 91b is screwed with the nut 95. As a result, the fastening shaft 91 is prevented from falling out of the arc grooves 83a and 84a and the long grooves 43 and 44. The spacer 96 and the thrust bearing 97 are disposed between the second side plate 84 and the nut 95 in a state of being penetrated by the fastening shaft 91. The spacer 96 is brought into contact with the periphery of the arc groove 84a, which is a part of the second side plate 84. The thrust bearing 97 is disposed between the nut 95 and the spacer 96.

As described above, in a case in which the fixed cam 93 and the rotating cam 94 are spaced apart from each other in the Y direction by the operation of the operation lever 92, the head 91a of the fastening shaft 91 is pressed in the −Y direction, and the nut 95 moves toward the −Y direction. Accordingly, a distance in the Y direction between the fixed cam 93 and the spacer 96 is reduced, and a frictional force between the fixed cam 93 and the first side plate 83, and a frictional force between the spacer 96 and the second side plate 84 increase. As a result, the movement of the fastening shaft 91 in the Z direction along the arc grooves 83a and 84a is restricted. Therefore, the movement of the upper column 2 in the Z direction, which is penetrated by the fastening shaft 91, is also restricted, and a position of the steering wheel 101 in the Z direction is secured.

The first side plate 83 and the second side plate 84 are fastened in the Y direction by the fixed cam 93 and the spacer 96. Thus, inner surfaces of the first side plate 83 and the second side plate 84 are brought into contact with the pair of second contact ribs 52 and 52 of the upper column 2. The first side plate 83 and the second side plate 84 press the pair of second contact ribs 52 to be compressed against each other. As a result, a compressive load is applied to the first protrusion 41 and the second protrusion 42 in the Y direction. The groove width of the slit 11 of the clamp 10 is narrower to clamp the lower column. As a result, the upper column 2 is secured to the lower column 3, and the movement of the steering wheel 101 in the X direction is restricted.

The first side plate 83 and the second side plate 84 press the pair of first contact ribs 51 and 51 in addition to the pair of second contact ribs 52 and 52. As a result, a compressive load acts on the pair of second contact ribs 52 and 52 to be able to reduce the diameter of the clamp 10. The first contact ribs 51 are spaced apart from the fastening shaft 91 on which a fastening force acts. Therefore, the compressive load acting on the first contact ribs 51 is smaller than the compressive load acting on the second contact ribs 52. On the other hand, even though the compressive load is applied to the second contact ribs 52, the first protrusion 41 and the second protrusion 42 are tilted so that only the ends of the first protrusion 41 and the second protrusion 42 in the −Z direction are close to each other; thereby, the slit 11 of the clamp 10 may not be narrowed. In other words, the compressive load can be applied to the clamp 10 by using the first contact ribs 51 without using the first protrusion 41 and the second protrusion 42. Therefore, during the operation of the operation lever 92, the clamp 10 reliably clamps the lower column 3.

By contrast, in a case in which the operation lever 92 is operated to bring the fixed cam 93 and the rotating cam 94 close to each other in the Y direction, the distance in the Y direction between the fixed cam 93 and the spacer 96 is increased. Thus, a frictional force between the fixed cam 93 and the first side plate 83 is reduced. Accordingly, a frictional force between the spacer 96 and the second side plate 84 is reduced. As a result, the fastening shaft 91 is allowed to move in the Z direction along the arc grooves 83a and 84a. In a case in which a load in the Z direction is applied to the steering wheel 101, the steering column 1, the steering shaft 102, and the gearbox 110 are rotated around the pivot shaft 74 in directions of arrow A1 or arrow A2 (see FIG. 1). As a result, a position of the steering wheel 101 in the Z direction is changed.

Fastening on the first contact ribs 51 and second contact ribs 52 by the first side plate 83 and the second side plate 84 is released. Therefore, the groove width of the slit 11 of the clamp 10 is widened, and clamping onto the lower column 3 is released. In a case in which a load in the X direction is applied to the steering wheel 101, the upper column 2 and the upper shaft 108 slide in the X direction. As a result, a position of the steering wheel 101 in the X direction is changed (see arrow B1 and arrow B2 in FIG. 1).

Next, the details of the clamp 10 and the contact ribs 50 will be described. A cross-sectional shape of the clamp 10 cut in a plane extending in the Y direction and the Z direction has substantially the same shape even through a cut position is moved in the X direction. In other words, the rigidity of each portion of the clamp 10 in the X direction is uniform. However, as illustrated in FIGS. 10 and 11, an end of the clamp 10 in the −X direction is continuous with the cylindrical part 20 in which the second annular rib 23 is provided. As a result, a portion of the clamp 10 near the cylindrical part 20 has a high apparent rigidity by the second annular rib 23, and is less deformable. By contrast, an end of a spaced clamp 17 in the +X direction is continuous with the attachment part 30 in which the cut-out portion 31 is provided, and has a low apparent rigidity. As described above, the clamp 10 is composed of a continuous clamp 16 that is positioned near the cylindrical part 20 and that is less deformable, and the spaced clamp 17 that is spaced apart from the cylindrical part 20 in the X direction and that is easily deformable. Each of the protrusions 40 includes a continuous protrusion 46 protruding from the continuous clamp 16 and a spaced protrusion 47 protruding from the spaced clamp 17.

In the present embodiment, in the clamp 10, about two-thirds of the clamp 10 is composed of the continuous clamp 16, and the remaining one-third is composed of the spaced clamp 17. Here, the ratio of the continuous clamp 16 to the spaced clamp 17 described above is an example, and the clamp of the present invention is not limited thereto. Furthermore, the continuous clamp 16 that is less deformable since the continuous clamp 16 is continuous with the cylindrical part 20 is exemplified in the present embodiment, but the continuous clamp 16 of the present invention can also be applied to a case in which the continuous clamp 16 is less deformable since a wall thickness of a part of the clamp 10 is thicker than that of the other part of the clamp 10.

In FIG. 10, an end surface 53c of the third contact rib 53 is illustrated as the hatched area to make the third contact rib 53 be clarified. As illustrated in FIG. 10, the third contact rib 53 is a rib that extends in the X direction. The third contact rib 53 is provided only on the second protrusion 42 of the pair of protrusions 40 and 40. A width of the third contact rib 53 in the Z direction is narrower than those of the first contact ribs 51 and the second contact ribs 52. An end 53a of the third contact rib 53 in the +X direction is positioned at an end of the second protrusion 42 in the +X direction. A length of the third contact rib 53 in the X direction is shorter than those of the first contact ribs 51 and the second contact ribs 52, and is about one-third of the length of the second protrusion 42 in the X direction. In other words, an end 53b of the third contact rib 53 in the −X direction is positioned closer to the +X direction than the center of the second protrusion 42 in the X direction. As described above, the third contact rib 53 extends only to the extent of the spaced protrusion 47 of the protrusions which protrudes from the spaced clamp 17. In addition, the third contact rib 53 extends along the long groove 44 of the second protrusion 42. Accordingly, the long groove 44 is interposed between the second contact rib 52 and the third contact rib 53.

In FIG. 11, an end surface 54c of the fourth contact rib 54 is illustrated as the hatched area to make the fourth contact rib 54 be clarified. As illustrated in FIG. 11, the fourth contact rib 54 is a rib that extends in the X direction. The fourth contact rib 54 is provided only on the first protrusion 41 of the pair of protrusions 40 and 40. A width of the fourth contact rib 54 in the Z direction is narrower than those of the first contact ribs 51 and the second contact ribs 52. An end 54a of the fourth contact rib 54 in the +X direction is positioned at an end of the first protrusion 41 in the +X direction. A length of the fourth contact rib 54 in the X direction is equal to the length of the third contact rib 53. The length of the fourth contact rib 54 is shorter than those of the first contact ribs 51 and the second contact ribs 52, and is about one-third of the length of the first protrusion 41 in the X direction. In other words, an end 54b of the fourth contact rib 54 in the −X direction is positioned closer to the +X direction than the center of the first protrusion 41 in the X direction. As described above, the fourth contact rib 54 extends only to the extent of the spaced protrusion 47 of the protrusions 40, which protrudes from the spaced clamp 17. In addition, the fourth contact rib 54 extends along the long groove 43 of the first protrusion 41. Accordingly, the long groove 43 is interposed between the second contact rib 52 and the fourth contact rib 54.

Next, protrusion amounts of the first contact ribs 51, the second contact ribs 52, the third contact rib 53, and the fourth contact rib 54 are described with reference to FIGS. 7, 12, and 13. As illustrated by auxiliary line W in FIG. 7, end surfaces 51a of the first contact ribs 51 and end surfaces 52a of the second contact ribs 52 are positioned at the same position in the Y direction. The cross-sectional view illustrated in FIG. 7 is a cross-sectional view viewed from a cross-section of the continuous clamp 16 in the clamp 10, and the third contact rib 53 and the fourth contact rib 54 are not illustrated in FIG. 7.

The protrusion amount of the first contact ribs 51 is constant at any position in the X direction where the first contact ribs 51 extend. The protrusion amount of the second contact ribs 52 is also constant at any position in the X direction where the second contact ribs 52 extend. In other words, as illustrated in FIGS. 12 and 13, positions of the end surfaces 51a of the first contact ribs 51 and positions of the end surfaces 52a of the second contact ribs 52 are not changed even though the positions are moved in the X direction.

As illustrated in FIGS. 12 and 13, the end surface 53c of the third contact rib 53 is positioned closer to the +Y direction than an end surface 51a of the first contact rib 51 and an end surface 52a of the second contact rib 52, which are provided on the second protrusion 42 (see auxiliary line W in FIGS. 12 and 13). Therefore, the protrusion amount of the third contact rib 53 is larger than those of the first contact rib 51 and the second contact rib 52. In addition, the protrusion amount of the third contact rib 53 is constant at any position in the X direction where the third contact rib 53 extends.

As illustrated in FIGS. 12 and 13, the position of the end surface 54c of the fourth contact rib 54 in the Y direction overlaps the auxiliary line W and is positioned at the same position as those of the end surface 51a of the first contact rib 51 and the end surface 52a of the second contact rib 52, which are provided on the first protrusion 41. Therefore, the protrusion amount of the fourth contact rib 54 is equal to those of the first contact rib 51 and the second contact rib 52. In addition, the protrusion amount of the fourth contact rib 54 is constant at any position in the X direction where the fourth contact rib 54 extends.

Next, a relationship between the first side plate 83 and the second side plate 84, and the contact ribs 50 will be described. The description will be described as two cases of a case in which the fastening shaft 91 overlaps the continuous clamp 16 in the Z direction (see G91 in FIG. 10), and a case in which the fastening shaft 91 overlaps the spaced clamp 17 in the Z direction (see H91 in FIG. 10). In FIGS. 14 to 19 used in this explanation, each component is abstractedly depicted.

First, the case in which the fastening shaft 91 overlaps the continuous clamp 16 (see G91 in FIG. 10) in the Z direction will be described. As illustrated in FIG. 14, the first contact ribs 51 and the second contact ribs 52 of the contact ribs 50 are present on a plane extending in the Y direction and the Z direction including the fastening shaft 91. The first side plate 83 and the second side plate 84 are not fastened before the fastening mechanism 90 is operated, and are not in contact with the first contact ribs 51 and the second contact ribs 52.

Next, as illustrated in FIG. 15, in a case in which the operation lever 92 is operated to cause the fastening mechanism 90 to fasten the first side plate 83 and the second side plate 84, the first side plate 83 and the second side plate 84 are brought close to each other and then into contact with the first contact ribs 51 and the second contact ribs 52. In a case in which the operation lever 92 is further operated, the first side plate 83 and the second side plate 84 press against the first contact ribs 51 and the second contact ribs 52.

Here, the fastening force of the fastening mechanism 90 acts between each of the first contact ribs 51 and each of the second contact ribs 52 in the Z direction (see arrows F in FIG. 15). The rigidity of the first side plate 83 and the second side plate 84 is less than that of the continuous clamp 16. Therefore, in a case in which the first side plate 83 and the second side plate 84 press against the first contact ribs 51 and the second contact ribs 52, middle portions of the first side plate 83 and the second side plate 84 in the Z direction are bent toward the clamp 10, as illustrated in FIG. 16. In other words, in a case in which the continuous clamp 16 is fastened, part of the operation force of the operation lever 92 is used to deform the first side plate 83 and the second side plate 84. As described above, the feel of operation of the operation lever 92 is lighter than a case in which the first side plate 83 and the second side plate 84 are not bent.

As illustrated in FIG. 16, the bending amount of the first side plate 83 is smaller than the bending amount of the second side plate 84. This is because the first side plate 83 is difficult to deform due to the protruding plate 87 (see FIG. 9).

Next, the case in which the fastening shaft 91 overlaps the spaced clamp 17 (see H91 in FIG. 10) in the Z direction will be described. As illustrated in FIG. 17, the first contact ribs 51, the second contact ribs 52, the third contact rib 53, and the fourth contact rib 54 are present on a plane extending in the Y direction and the Z direction including the fastening shaft 91. The first side plate 83 and the second side plate 84 are not in contact with any of the first contact ribs 51, the second contact ribs 52, the third contact rib 53, and the fourth contact rib 54, before the fastening mechanism 90 is operated.

Next, as illustrated in FIG. 18, in the case in which the operation lever 92 is operated to cause the fastening mechanism 90 to fasten the first side plate 83 and the second side plate 84, the second side plate 84 is first brought into contact with the third contact rib 53.

Here, the second side plate 84 is further easily deformable than the first side plate 83. Accordingly, as illustrated in FIG. 19, in a case in which the fastening mechanism 90 further fastens the first side plate 83 and the second side plate 84, a portion of the second side plate 84 brought into contact with the third contact rib 53 is bent toward the +Y direction, and the second side plate 84 is then brought into contact with the first 83 contact rib 51 and the second contact rib 52. Meanwhile, the first side plate 83 is brought into contact with the other first contact rib 51, the other second contact rib 52, and the fourth contact rib 54 without deformation.

In addition, in the case in which the operation lever 92 is operated to cause the fastening mechanism 90 to further fasten the first side plate 83 and the second side plate 84, the first side plate 83 and the second side plate 84 press the first contact ribs 51 and the second contact ribs 52. Here, the middle portion of the first side plate 83 in the Z direction is brought into contact with the fourth contact rib 54. In addition, the middle portion of the second side plate 84 in the Z direction is brought into contact with the third contact rib 53. Therefore, the middle portions of the first side plate 83 and the second side plate 84 in the Z direction are not bent toward the clamp 10.

As described above, in the case in which the spaced clamp 17 is fastened, the second side plate 84 is first brought into contact with the third contact rib 53 before the first contact rib 51 and the second contact rib 52. Accordingly, a load is started to be applied to the operation lever 92 at a stage where the operation amount of the operation lever 92 is small, and the feel of operation of the operation lever is heavy. In addition, the middle portions of the first side plate 83 and the second side plate 84 in the Z direction are not bent toward the clamp 10. In other words, a factor that makes the feel of operation of the operation lever 92 lighter is eliminated. Therefore, the feel of operation of the operation lever 92 in the case in which the spaced clamp 17 is fastened is heavy. In other words, the difference between the feel of operation in the case in which the continuous clamp 16 is fastened and the feel of operation in the case in which the spaced clamp 17 is fastened is small, so that the operation lever 92 can be operated with the same feel of operation.

As described above, the steering device 100 of the embodiment includes the steering shaft 102, the steering column 1, the bracket (second bracket 80), and the fastening mechanism 90. The steering shaft 102 is a telescopic steering shaft that extends in the first direction. The steering column 1 includes the lower column 3 and the upper column 2 that are relatively slidably coupled to each other in the first direction. The bracket (second bracket 80) includes the first side plate 83 and the second side plate 84 that sandwich the steering column 1 from the second direction orthogonal to the first direction. The fastening mechanism 90 has the operation lever 92 and the fastening shaft 91 penetrating the first side plate 83 and the second side plate 84 and fastens the first side plate 83 and the second side plate 84. The upper column 2 includes the clamp 10, the cylindrical part 20, the pair of protrusions 40 and 40, and the contact ribs 50. The clamp 10 has the slit 11 extending in the first direction and is externally slidably fitted to the lower column 3. The cylindrical part 20 extends from the clamp 10 and supports the steering shaft 102. The pair of protrusions 40 and 40, between which the slit 11 is interposed, protrudes radially outward from the clamp 10 and is provided with the long grooves 43 and 44 into which the fastening shaft 91 is inserted. The contact ribs 50 protrude from the outer peripheral surface of the clamp 10 or side surfaces of the pair of protrusions 40 and 40, and are brought into contact with the first side plate 83 and the second side plate 84 fastened by the fastening mechanism 90. The clamp 10 is composed of the continuous clamp 16 that is positioned near the cylindrical part 20 and that is continuous with the cylindrical part 20, and the spaced clamp 17 that is spaced apart from the cylindrical part 20. The protrusions 40 include the continuous protrusions 46 protruding from the continuous clamp 16 and the spaced protrusions 47 protruding from the spaced clamp 17. The contact ribs 50 each have the pair of first contact ribs 51 and 51, the pair of second contact ribs 52 and 52, and at least one third contact ribs 53. The pair of first contact ribs 51 and 51 is disposed on the outer peripheral surface of the clamp 10 and extends across the continuous clamp 16 and the spaced clamp 17. The pair of second contact ribs 52 and 52 is respectively disposed on side surfaces of the protrusions 40 and disposed opposite to the first contact ribs 51 with respect to the long grooves 43 and 44, and extends across the continuous protrusions 46 and the spaced protrusions 47. The single third contact rib 53 is disposed on a side surface of the spaced protrusion 47 and disposed between the first contact rib 51 and the long groove 44. The third contact rib 53 has the protrusion amount greater than those of the first contact rib 51 and second contact rib 52.

According to the embodiment, in the case in which the continuous clamp 16 is fastened, the first side plate 83 and the second side plate 84 are bent toward the clamp which makes the feel of operation of the operation lever lighter. By contrast, in the case in which the spaced clamp 17 is fastened, the first side plate 83 and the second side plate 84 are not bent toward the clamp 10. Thus, the factor that makes the feel of operation of the operation lever 92 lighter is eliminated. Moreover, since a load is applied to the operation lever 92 at a stage where the operation amount of the operation lever 92 is small, the feel of operation of the operation lever 92 is heavy. As described above, in the case in which the continuous clamp 16 and the spaced clamp 17 are fastened, the difference in the feel of operation of the operation lever 92 is small, which less causes discomfort to the operator.

In the steering device 100 of the embodiment, the third contact rib 53 is a single rib, and the second side plate 84 has a lower rigidity than the first side plate 83 does. The pair of protrusions 40 and 40 includes the first protrusion 41 facing the first side plate 83 and the second protrusion 42 facing the second side plate 84. The third contact rib 53 is disposed on the second protrusion 42. The contact ribs 50 include the single fourth contact rib 54 that protrudes from a side surface of the first protrusion 41. The fourth contact rib 54 is disposed on a side surface of the spaced protrusion 47 and disposed between the first contact rib 51 and the long groove 43, and has the protrusion amount equal to those of the first contact rib 51 and the second contact rib 52.

According to the embodiment, in the case in which the first side plate 83 presses against the first contact rib 51 and the second contact rib 52, the first side plate 83 is not bent toward the clamp 10. Thus, the factor that makes the feel of operation of the operation lever 92 lighter is eliminated, and the feel of operation in the case in which the spaced clamp 17 is fastened can be further heavier. The second side plate 84 having a lower rigidity is brought into contact with the third contact rib 53. In other words, the second side plate 84 is brought close to the third contact rib 53, is then deformed, approaches toward the second protrusion 42, and is brought into contact with the first contact rib 51 and the second contact rib 52. Thus, the second side plate 84 can reliably press against the first contact rib 51 and the second contact rib 52.

As described above, the embodiment has been described, but the present invention is not limited thereto. For example, in a case in which one-half of the clamp 10 corresponds to each of the continuous clamp 16 and the spaced clamp 17, the third contact rib 53 and the fourth contact rib 54 may extend to the center of the first protrusion 41 and the second protrusion 42 in the X direction. In the embodiment, the fourth contact rib 54 is provided on the spaced protrusion 47 of the first protrusion 41, and the third contact rib 53 is provided on the spaced protrusion 47 of the second protrusion 42, but the present invention is not limited thereto. For example, the third contact rib 53 may be provided on the spaced protrusion 47 of the first protrusion 41, and the fourth contact rib 54 may be provided on the spaced protrusion 47 of the second protrusion 42. Alternatively, a third contact rib 53 may be provided on the spaced protrusion 47 of the first protrusion 41, and the third contact rib 53 may be further provided on the spaced protrusion 47 of the second protrusion 42. In other words, the present embodiment may have two or more third contact ribs 53. Alternatively, the third contact rib 53 may be provided on either one of the spaced protrusion 47 of the first protrusion 41 or the spaced protrusion 47 of the second protrusion 42, and any of the third contact rib 53 and the fourth contact rib 54 may not be provided on the other side. In other words, one or more third contact ribs 53 can be provided to prevent the first side plate 83 or the second side plate 84 from bending and to eliminate the factor that makes the feel of operation of the operation lever lighter.

REFERENCE SIGNS LIST

100 Steering device
101 Steering wheel
102 Steering shaft
108 Upper shaft
109 Lower shaft
110 Gearbox
1 Steering column
2 Upper column
3 Lower column
10 Clamp
11 Slit
12 First expansion slit
13 Second expansion slit (expansion slit)

16 Continuous clamp
17 Spaced clamp
20 Cylindrical part
21 Bearing
23 Second annular rib
30 Attachment part (extending part)
(41, 42) Protrusion (first protrusion, second protrusion)
43, 44 Long groove
46 Continuous protrusion
47 Spaced protrusion
50 Contact rib
51 First contact rib
52 Second contact rib
53 Third contact rib
54 Fourth contact rib
70 First bracket
74 Pivot shaft
80 Second bracket (bracket)
83 First side plate
84 Second side plate
90 Fastening mechanism
91 Fastening shaft
92 Operation lever
93 Fixed Cam
94 Rotating Cam
95 Nut

The invention claimed is:

1. A steering device comprising:
a telescopic steering shaft that extends in a first direction;
a steering column that includes a lower column and an upper column that are configured to be relatively slidably coupled to each other in the first direction;
a bracket including a first side plate and a second side plate configured to sandwich the steering column from a second direction orthogonal to the first direction; and
a fastening mechanism that has an operation lever and a fastening shaft penetrating the first side plate and the second side plate and configured to fasten the first side plate and the second side plate, wherein
the upper column includes:
  a clamp that has a slit extending in the first direction and that is configured to be externally slidably fitted to the lower column;
  a cylindrical part that extends from the clamp and that is configured to support the steering shaft,
  a pair of protrusions between which the slit is interposed, each of the protrusions protruding radially outward from the clamp and being provided with long groove into which the fastening shaft is inserted; and
  contact ribs that protrude from an outer peripheral surface of the clamp or side surfaces of the pair of protrusions and that are brought into contact with the first side plate and the second side plate fastened by the fastening mechanism,
the clamp includes:
  a continuous clamp that is positioned near the cylindrical part and that is continuous with the cylindrical part; and
  a spaced clamp that is spaced apart from the cylindrical part,
each of the protrusions includes:
  a continuous protrusion that protrudes from the continuous clamp; and
  a spaced protrusion that protrudes from the spaced clamp,
the contact ribs include:
  a pair of first contact ribs each of which is disposed on the outer peripheral surface of the clamp and extends across the continuous clamp and the spaced clamp;
  a pair of second contact ribs each of which is disposed on a side surface of the protrusion and disposed opposite to the first contact rib with respect to the long groove, and extends across the continuous protrusion and the spaced protrusion; and
  at least one third contact rib that is disposed on a side surface of the spaced protrusion and disposed between the first contact rib and the long groove, and
the at least one third contact rib has a protrusion amount greater than those of the first contact rib and the second contact rib.

2. The steering device according to claim 1, wherein
the at least one third contact rib is a single contact rib,
the second side plate has a lower rigidity than that of the first side plate,
the pair of protrusions includes a first protrusion facing the first side plate and a second protrusion facing the second side plate,
the third contact rib is disposed on the second protrusion,
the contact ribs further include a single fourth contact rib that protrudes from a side surface of the first protrusion, and
the fourth contact rib is disposed on a side surface of the spaced protrusion and between the first contact rib and the long groove, and has a protrusion amount equal to those of the first contact rib and the second contact rib.

* * * * *